(12) United States Patent
Lu

(10) Patent No.: US 8,277,691 B2
(45) Date of Patent: Oct. 2, 2012

(54) HIGH PERFORMANCE CARBON NANOCOMPOSITES FOR ULTRACAPACITORS

(75) Inventor: Wen Lu, Littleton, CO (US)

(73) Assignee: Ada Technologies, Inc., Littleton, CO (US)

( * ) Notice: Subject to any disclaimer, the term of this patent is extended or adjusted under 35 U.S.C. 154(b) by 185 days.

(21) Appl. No.: 12/435,992

(22) Filed: May 5, 2009

(65) Prior Publication Data

US 2009/0272946 A1 Nov. 5, 2009

Related U.S. Application Data

(60) Provisional application No. 61/050,496, filed on May 5, 2008.

(51) Int. Cl.
*H01B 1/02* (2006.01)

(52) U.S. Cl. .......... 252/511; 252/502; 427/77; 977/750; 977/752

(58) Field of Classification Search .................. 252/511, 252/502; 427/77; 977/750, 752
See application file for complete search history.

(56) References Cited

U.S. PATENT DOCUMENTS

| | | | |
|---|---|---|---|
| 4,603,165 A * | 7/1986 | McDonald et al. | 524/440 |
| 5,908,715 A * | 6/1999 | Liu et al. | 429/217 |
| 6,096,453 A | 8/2000 | Grunwald | |
| 6,235,433 B1 | 5/2001 | Amano et al. | |
| 6,268,088 B1 | 7/2001 | Oh et al. | |
| 6,283,812 B1 | 9/2001 | Jin et al. | |
| 6,396,682 B1 | 5/2002 | Kim et al. | |
| 6,503,660 B2 | 1/2003 | Baker et al. | |
| 6,563,694 B2 | 5/2003 | Kim et al. | |
| 6,667,825 B2 | 12/2003 | Lu et al. | |
| 6,726,732 B2 | 4/2004 | Kim et al. | |
| 6,790,425 B1 | 9/2004 | Smalley et al. | |
| 6,828,062 B2 | 12/2004 | Lu et al. | |
| 6,939,453 B2 | 9/2005 | Anderson et al. | |
| 6,991,876 B2 | 1/2006 | Narang et al. | |
| 7,061,749 B2 | 6/2006 | Liu et al. | |
| 7,147,966 B2 | 12/2006 | Ren et al. | |
| 7,157,588 B2 | 1/2007 | Harmer et al. | |
| 7,238,772 B2 | 7/2007 | Harmer et al. | |
| 7,283,349 B2 | 10/2007 | Yoshida et al. | |
| 7,297,289 B2 | 11/2007 | Sato et al. | |
| 7,505,250 B2 | 3/2009 | Cho et al. | |
| 7,648,406 B2 | 1/2010 | Tai et al. | |
| 2001/0024352 A1 | 9/2001 | Kim et al. | |
| 2001/0030847 A1 | 10/2001 | Kim et al. | |
| 2003/0077515 A1 | 4/2003 | Chen et al. | |
| 2004/0094741 A1 | 5/2004 | Sato et al. | |
| 2004/0167014 A1 | 8/2004 | Yan et al. | |
| 2004/0191617 A1 | 9/2004 | Visco et al. | |
| 2005/0040090 A1 | 2/2005 | Wang et al. | |
| 2005/0042450 A1 | 2/2005 | Sano et al. | |
| 2005/0081983 A1 | 4/2005 | Nakayama et al. | |
| 2005/0103706 A1 | 5/2005 | Bennett et al. | |
| 2005/0155216 A1 * | 7/2005 | Cho et al. | 29/623.5 |
| 2005/0175894 A1 | 8/2005 | Visco et al. | |
| 2005/0221193 A1 | 10/2005 | Kinouchi et al. | |
| 2005/0231785 A1 | 10/2005 | Oh et al. | |
| 2005/0231891 A1 | 10/2005 | Harvey | |
| 2006/0078790 A1 | 4/2006 | Nimon et al. | |
| 2006/0100323 A1 | 5/2006 | Schmidt et al. | |
| 2006/0120021 A1 | 6/2006 | Banno et al. | |
| 2006/0203322 A1 | 9/2006 | Radmard et al. | |
| 2006/0226396 A1 | 10/2006 | Majumdar et al. | |
| 2006/0238957 A1 | 10/2006 | Mitsuda et al. | |
| 2006/0257645 A1 | 11/2006 | Asaka et al. | |
| 2007/0021569 A1 | 1/2007 | Willis et al. | |
| 2007/0031729 A1 | 2/2007 | Sato et al. | |
| 2007/0153353 A1 * | 7/2007 | Gruner | 359/245 |
| 2007/0201184 A1 | 8/2007 | Plee et al. | |
| 2007/0258192 A1 | 11/2007 | Schindall et al. | |
| 2008/0063585 A1 | 3/2008 | Smalley et al. | |
| 2008/0138700 A1 | 6/2008 | Horpel et al. | |
| 2008/0192407 A1 * | 8/2008 | Lu et al. | 361/502 |
| 2008/0212261 A1 | 9/2008 | Ajayan et al. | |
| 2009/0272946 A1 * | 11/2009 | Lu | 252/511 |
| 2010/0021819 A1 | 1/2010 | Zhamu et al. | |

FOREIGN PATENT DOCUMENTS

| | | |
|---|---|---|
| DE | 19829030 | 10/1999 |
| EP | 1198022 | 4/2002 |
| EP | 1380569 | 1/2004 |
| EP | 1548751 | 6/2005 |
| EP | 1672651 | 6/2006 |
| JP | 2003-234254 | 8/2003 |
| JP | 2008-016769 | 1/2008 |
| WO | WO 02/053808 | 7/2002 |
| WO | WO 02/063073 | 8/2002 |
| WO | WO 03/012896 | 2/2003 |
| WO | WO 2005/038962 | 4/2005 |
| WO | WO 2005/083829 | 9/2005 |
| WO | WO 2005/104269 | 11/2005 |
| WO | WO 2005/116161 | 12/2005 |
| WO | WO 2006/137893 | 12/2006 |

(Continued)

OTHER PUBLICATIONS

Huang et al., "Plasma Etching for Purification and Controlled Opening of Aligned Carbon Nanotubes," J. Phys. Chem. B, 2002, vol. 106(14), pp. 3543-3545.

(Continued)

*Primary Examiner* — Mark Eashoo
*Assistant Examiner* — M. Reza Asdjodi
(74) *Attorney, Agent, or Firm* — Sheridan Ross, PC

(57) ABSTRACT

The present invention relates to composite electrodes for electrochemical devices, particularly to carbon nanotube composite electrodes for high performance electrochemical devices, such as ultracapacitors.

18 Claims, 19 Drawing Sheets

FOREIGN PATENT DOCUMENTS

| WO | WO 2007/010039 | | 1/2007 |
|---|---|---|---|
| WO | WO 2007/010042 | | 1/2007 |
| WO | WO 2008/016990 | * | 2/2008 |

OTHER PUBLICATIONS

Tsai et al., "Bias-enhanced nucleation and growth of the aligned carbon nanotubes with open ends under microwave plasma synthesis," Applied Physics Letters, Jun. 1999, vol. 74(23), pp. 3462-3464.

Signorelli et al. "Nanotube Enhanced Ultracapacitors," Dec. 6-8, 2004, 13 pages.

International Preliminary Report on Patentability for International (PCT) Patent Application No. PCT/US2009/042885, mailed Nov. 18, 2010.

Examination Report for United Kingdom Patent Application No. GB1020479.0, dated Jan. 5, 2011, 3 pages.

Kim, et al., "Synthesis and Electrochemical Characterization of Vanadium Oxide on Carbon Nanotube Film Substrate for Pseudocapacitor Applications", Journal of the Electrochemical Society, 2006, vol. 153, No. 6, pp. A989-A996.

Perebeinos, et al., "Electron-Phonon Interaction and Transport in Semiconducting Carbon Nanotubes", Physical Review Letters—The American Physical Society, Mar. 4, 2005, vol. 94, pp. 086802-1-086802-4.

International Search Report for International (PCT) Patent Application No. PCT/US09/42885, mailed Jul. 22, 2009.

Written Opinion for International (PCT) Patent Application No. PCT/US09/42885, mailed Jul. 22, 2009.

U.S. Appl. No. 13/113,971, filed May 23, 2011, Lu et al.

Ionic Liquids Product Range, EMD, Apr. 25, 2006, 12 pages found @ http://www.emdchemicals.com/showBrochure?id=200904.3312.

Official Action for United Kingdom Application No. GB1020479.0, dated Oct. 6, 2011 6 pages.

U.S. Appl. No. 12/412,047, filed Mar. 26, 2009, Lu, et al.

"High-power lithium-ion (BU5A)", BatteryUniversity.com Website, as early as Mar. 16, 2006, available at http://batteryuniversity.com/partone-5A.htm, printed on Apr. 28, 2009, pp. 1-7.

"File: Carbon nanorim armchair povray.PNG", Wikimedia Commons Website, as early as Nov. 27, 2007, available at http://commons.wikimedia.org/wiki/File:Carbon_nanorim_armchair_povray.PNG, printed on Jun. 18, 2009, pp. 1-5.

"File: Carbon nanorim armchair povray.PNG", Wikimedia Commons Website, as early as Nov. 27, 2007, available at http://commons.wikimedia.org/wiki/File:Carbon_nanotube_armchair_povray.PNG, printed on Jun. 18, 2009, pp. 1-5.

"File: Types of Carbon Nanotubes.png", Wikipedia website, as early as May 2006, available at http://en.wikipedia.org/wiki/File:Types_of_Carbon_Nanotubes.png, printed on Jun. 26, 2009, pp. 1-5.

Srinivasan, et al., "A Model-based Comparison of Various Li-ion Chemistries", Prepared for Berkeley Electrochemical Research Council, as early as May 1, 2006, available at http://berc.lbl.gov/venkat/Ragone-construction.pps, pp. 1-17

Covalent Associates, Inc. home page, as early as Sep. 14, 2000, available at www.covalentassociates.com, pp. 1-2, printed on Jun. 19, 2009.

"Ionic Liquids", description on Solvant-innovation website, as early as Feb. 1, 2001, http://web.archive.org/web/20010203174200/www.solvent-innovation.com/Englisch/index2.htm, pp. 1-2, printed on Jun. 19, 2009.

Solvant-Innovation Home Page, as early as Feb. 1, 2001, available at http://web.archive.org/web/20010203174200/www.solvent-innovation.com/Englisch/index2.htm, pp. 1-2, printed on Jun. 19, 2009.

"Nanobatteries", Wikipedia website, as early as Dec. 26, 2007, available at http://en.wikipedia.org/wikilNanobatteries, pp. 1-2, printed on Jun. 19, 2009.

Burke, "Ultracapicitors: why, how, and where is the technology", Journal of Power Sources, 2000, vol. 91, pp. 37-50.

Conway, "Transition from 'Supercapacitor' to 'Battery' Behavior in Electrochemical Energy Storage", J. Electrochem Soc., Jun. 1991, vol. 138, No. 6, pp. 1539-1548.

Conway, et al., "Double-layer and pseudocapacitance types of electrochemical capacitors and their applications to the development of hybrid devices", J Solid State Electrochem, vol. 7, 2003, pp. 637-644.

Cottineau, et al., "Nanostructured transition metal oxides for aqueous hybrid electrochemical supercapacitors", Appl. Phys. A, 2006, vol. 82, pp. 599-606.

Croce, et al., "Sythesis and Characterization of Highly Conducting Gel Electrolytes", Electrochimica Acta, 1994, vol. 39, No. 14, pp. 2187-2194.

Duong, "2002 Annual Progress Report for Energy Storage Research and Development, FreedomCAR & Vehicle Technologies Program", Energy Storage Research & Development, U.S. DOE, May 2003, pp. 1-178.

Freemantle, "Designer Liquids in Polymer Systems: Versataile and advantageous, ionic liquids are beginning to create waves in polymer science", Chemical and Engineering News, May 3, 2004, vol. 82, No. 18, pp. 26-29, printed Jan. 26, 2009.

Herring, et al., "A Novel Method for the Templated Synthesis of Homogeneous Samples of Hollow Carbon Nanospheres from Cellulose Chars", Journal of the American Chemical Society, 2003, vol. 125, No. 33, pp. 9916-9917.

Jiang, et al., "Electrochemical supercapicitor material based on manganese oxide: preparation and characterization", Electrochimica Acta, 2002, vol. 47, pp. 2381-2386.

Kalhammer, et al., Status and Prospects for Zero Emissions Vehicle Technology: Report of the ARB Independent Expert Panel 2007, Prepared for the State of California Air Resources Board, Sacramento, California, Apr. 13, 2007, available at http://www.arb.ca.gov/msprog/zevprog/zevreview/zev_panel_report.pdf.

Kubota, et al., "Ionically conductive polymer gel electrolytes prepared from vinyl acetate and methyl methacrylate for electric double layer capacitor", Journal of Applied Polymer Science, 2000, vol. 76, pp. 12-18.

Lee, et al., "Ideal Supercapacitor Behavior of Amorphous $V_2O_5 \cdot nH_2O$ in Potassium Chloride (KCl) Aqueous Solution", Journal of Solid State Chemistry, 1999, vol. 148, pp. 81-84.

Lewandowski, et al., "Carbon-ionic liquid double-layer capacitors", Journal of Physics and Chemistry of Solids, Mar. 2004, vol. 65, No. s 2-3, pp. 281-286.

Lu, et al., "High Performance Electrochemical Capacitors from Aligned Carbon Nanotube Electrodes and Ionic Liquid Electrolytes", Journal of Power Sources, Apr. 15, 2009, vol. 189, No. 2, pp. 1270-1277.

Lu, et al., "Ionic Liquid-Incorporated Gel Polymer Electrolytes for Ultracapacitors" submitted to 209th Electrochemical Society Meeting held May 7-12, 2006 in Denver, CO (Abstract).

Lu, et al., "Ionic Liquid-Incorporated Gel Polymer Electrolytes for Ultracapacitors", Presented to the 209th Electrochemical Society Meeting held May 7-12, 2006, Denver, CO, pp. 1-23 (PowerPoint Presentation).

Lu, et al., "Ionic Liquid-Incorporated Gel Polymer Electrolytes for Ultracapacitors", ECS Transactions, 2007, vol. 2, No. 28, pp. 15-26.

Lu, et al., "Superior Capacitive Performance of Aligned Carbon Nanotubes in Ionic Liquids", Manuscript submitted to ECS Transactions for consideration of publication, Jun. 15, 2007, pp. 1-5.

Lu, et al., "Superior Capacitive Performance of Aligned Carbon Nanotubes in Ionic Liquids", The 211th ECS Meeting, Chicago, Illinois, May 6-11, 2007, abstract only, p. 1.

Lu, et al., "Ultra-efficient Supercapacitors from Aligned Carbon Nanotubes and Ionic Liquids", Manuscript submitted to Science for consideration of publication , Jun. 13, 2007, pp. 1-31.

McEwen, et al., "EMIPF6 Based Nonaqueous Electrolytes for Electrochemical Capacitors", Electrochemical Society Proceedings, 1997, vol. 96-25, pp. 313-324.

Niu, et al., "High power electrochemical capacitors based on carbon nanotube electrodes", Appl. Phys. Lett., Mar. 17, 1997, vol. 70, No. 11, pp. 1480-1482.

Osaka, et al., "An Electrochemical Double Layer Capacitor Using an Activated Carbon Electrode with Gel Electrolyte Binder", Journal of the Electrochemical Society, 1999, vol. 146, No. 5, pp. 1724-1729.

Portet, et al., "High power density electrodes for Carbon supercapacitor applications", Electrochimica Acta, vol. 50, 2005, pp. 4174-4181.

Slane, et al., "Composite gel electrolyte for rechargeable lithium batteries", Journal of Power Sources, 1995, vol. 55, pp. 7-10.

Song et al., "Review of Gel-Type Polymer Electrolytes for Lithium-Ion Batteries", J. Power Sources, 77 (1999) 183.

Sung, et al., "Preparation and Characterization of Poly(vinyl chloride-co-vinyl acetate)-Based Gel Electrolytes for Li-Ion Batteries", Journal of the Electrochemical Society, Apr. 1988, vol. 145, No. 4, pp. 1207-1211.

Tarascon et al., "Performance of Bellcore's Plastic Rechargeable Li-Ion Batteries", Solid State Ionics, 86-88 (1996) 49-54.

Watanabe, et al., "High Lithium Ionic Conductivity of Polymeric Solid Electrolytes", Makromol. Chem. Rapid. Commun., 1981, vol. 2, pp. 741-744.

Background of the invention for the above captioned application (previously provided).

Kim et al. "Pseudocapacitive Properties of Electrochemically Prepared Vanadium Oxide on Carbon Nanotube Film Substrate," Journal of Electrochemistry Society, Jun. 2006, vol. 153, No. 8, pp. A1451-A1458.

Pushparaj et al. "Flexible energy storage devices based on nanocomposite paper," PNAS, Aug. 21, 2007, vol. 104, No. 34, pp. 13574-13577.

Official Action for United Kingdom Patent Application No. GB1020479.0, dated May 10, 2012 3 pages.

* cited by examiner

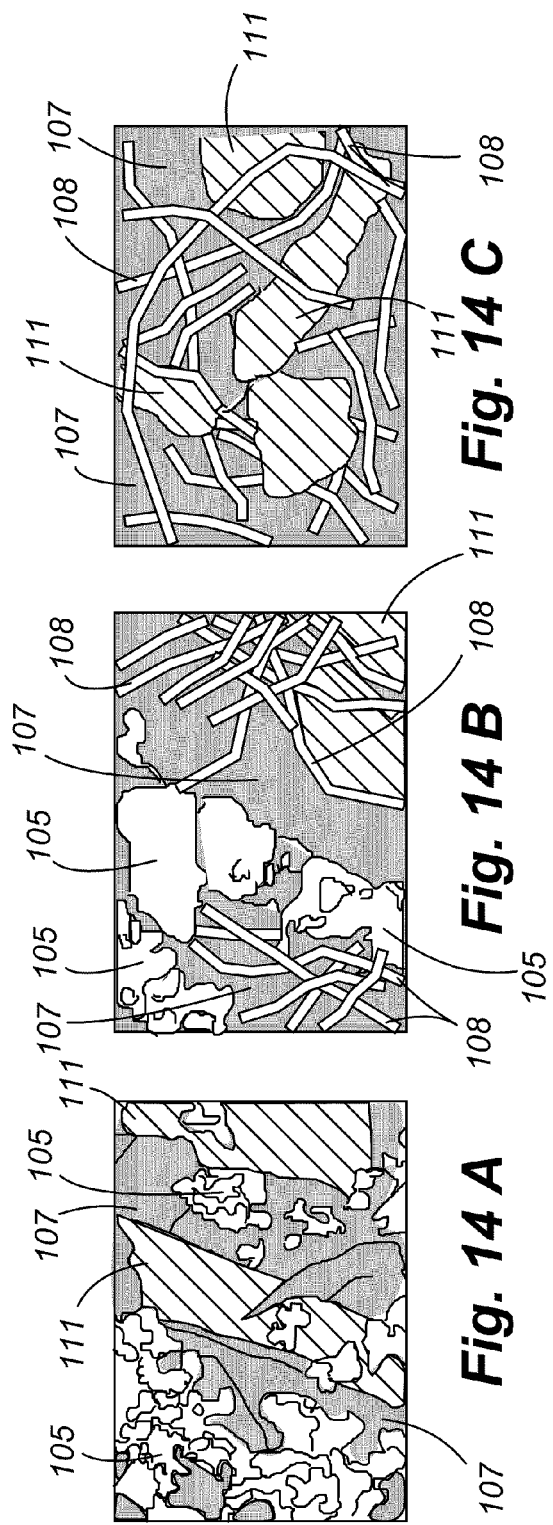

HIGH PERFORMANCE CARBON NANOCOMPOSITES FOR ULTRACAPACITORS

CROSS REFERENCE TO RELATED APPLICATION

The present application claims the benefits of U.S. Provisional Application Ser. No. 61/050,496, filed May 5, 2008, entitled "High Performance Carbon Nanocomposites for Ultracapacitors", which is incorporated herein by this reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Nos. DE-FG02-07ER84688 and DE-FG02-05ER84218 awarded by the Department of Energy.

FIELD OF THE INVENTION

The invention relates generally to composite electrodes for electrochemical devices and particularly to carbon nanocomposite electrodes for high performance ultracapacitors.

BACKGROUND OF THE INVENTION

Electrodes are an essential component for charge storage and delivery in high performance electrochemical energy storage devices. High performance electrodes are components for electrochemical devices including, for example, ultracapacitors, batteries, fuel cells, sensors, and photoelectrochemical solar cells. Broadly, electrochemical energy storage devices are used in utility, transportation, electronics, medical, and defense applications. More specifically, electrochemical energy storage devices have applications for: emergency backup power for electrical transmission and distribution systems; electric, hybrid-electric, and plug-in hybrid vehicles; notebook computers; cellular telephones; pagers; video cameras; hand-held tools; portable defibrillators; drug delivery units; neurological stimulators; specialized mobile power applications; unmanned aerial vehicles; spacecraft probes; and missile systems.

Ultracapacitors (also referred to as supercapacitors, electrical double-layer capacitors, or electrochemical capacitors), electrochemical are energy storage devices that combine the high-energy storage potential of batteries with the high-energy transfer rate and high recharging capabilities of capacitors. Ultracapacitors can have energy densities orders of magnitude greater than conventional capacitors and power densities orders of magnitude greater than conventional batteries. Generally, ultracapacitors have energy densities in the range of about 1 to about 10 Wh/kg, which is about one-tenth of that of secondary batteries, which have energy densities of about 20 to about 100 Wh/kg, and power densities in the range of about 1,000 to about 2,000 W/kg, which is about ten times higher than those of secondary batteries, which have power densities in the range of about 50 to about 200 W/kg.

Energy storage in ultracapacitors can be either Faradic or non-Faradic. One common type of Faradic ultracapacitor is an oxidative/reductive ultracapacitor, the Faradic capacitor transfers electrons across an electrode interface. Faradic ultracapacitors are based on mixed metal oxides, such as ruthenium dioxide and other transition metal oxides. For reasons of high cost, scarcity, and toxicity of suitable metal oxides, Faradic ultracapacitors are generally not preferred in most applications.

In non-Faradic ultracapacitors, electron transfer does not take place across an electrode interface, instead electric charge and energy are electrostatically stored. That is, positive and negative electrostatic charges accumulate on the electrodes at the electrode-electrolyte interface. Electrical energy is stored as an electrostatic force in form of a charge separation in the electric double layer between an ionically conducting electrolyte and the electrode.

In Faradic and non-Faradic capacitor systems, capacitance depends on the characteristics and properties of the electrode material. The electrode material preferably has electrically conducting properties, a porous structure, or both. The porous structure (that is, pore size, pore size distribution, and pore volume fraction) provides a large surface area for the development of an electrical double layer for non-Faradic static charge storage or for reversible chemical oxidation-reduction reactions for Faradic capacitance.

In commercial ultracapacitors, the electrode material comprises an activated carbon. FIG. 1 depicts an activated carbon electrode 90 of the prior art, comprising a metal current collector 101 and a carbon coating 103. The carbon coating 103 comprises a mixture of carbon black 105 and activated carbon 107 particles dispersed in a polymer matrix 111. FIG. 2 depicts a scanning electron microscope image of the carbon coating 103 comprising activated carbon 107 and carbon black 105 particles. The carbon black particles 105 form carbon black aggregates 109 (see FIG. 3). The carbon black aggregates 109 are positioned between and in physical contact with one or more activated carbon particles 107.

The charge storage capacity of the electrode 90 varies with the type of carbon (that is, carbon black and activated carbon) and the accessibility of the carbon to the electrolyte. Poor electrolyte accessibility to the carbon is a primary reason for decreased capacitance.

Therefore, a need exists for electrodes capable of providing high energy and power densities, as well as, longer cycle lives and safer operating conditions. That is, a need exists for electrodes that more effectively and efficiency store and/or deliver charge.

SUMMARY OF THE INVENTION

These and other needs are addressed by the various embodiments and configurations of the present invention. The present invention is directed generally to the use of carbon nanotubes (CNTs) and/or ionic liquid/polymer structures in various electrochemical devices, particularly ultracapacitors.

One aspect of the present invention is an electrode material for an electrochemical energy storage device, comprising:
 (a) a plurality of activated carbon particles;
 (b) a plurality of carbon nanotubes; and
 (c) a polymer binder, wherein most of the carbon nanotubes are in contact with at least two or more of the plurality of the activated carbon particles.

Another aspect of the present invention is an electrode material, comprising:
 (a) a plurality of activated carbon particles;
 (b) a plurality of carbon nanotubes; and
 (c) an ionic liquid, wherein the activated carbon particles and the carbon nanotubes are substantially distributed throughout the ionic liquid and wherein the ionic liquid substantially binds together the activated carbon particles and carbon nanotubes.

Yet another aspect of the current invention is an electrode material, comprising:
(a) a plurality of activated carbon particles; and
(b) a plurality of carbon nanotubes, wherein the electrode material has one or both of a surface resistance from about 2 to about 12 ohms/cm and a specific surface area of from about 500 to about 2,00 m$^2$/g.

Still yet another aspect of the present invention is a method for making an electrochemical energy storage device electrode, comprising the steps of:
(a) dissolving a binder in a solvent, to form a binder solution;
(b) forming a slurry by adding to the binder solution activated carbon particles and carbon nanotubes;
(c) contacting the slurry with a substrate, wherein the slurry forms a coating on the substrate; and
(d) removing the solvent from the coating to form a composite layer on the substrate.

Yet another aspect of the present invention is an electrochemical device, comprising:
a composite electrode material having:
a plurality of activated carbon particles;
a plurality of carbon nanotubes; and
a first ionic liquid, wherein the composite electrode material is positioned on and in physical contact with an electrical current collector to form a capacitor electrode; and
a second ionic liquid in contact with the composite electrode material.

The activated carbon has a specific surface area of at least about 500 m$^2$/g. The porosity of the activated carbon resides in the micropore range. The activated carbon can have any particle size. Preferred particle size ranges from about 100 μm or less, more preferred particle sizes are about 50 μm or less. In one embodiment, the activated carbon particles have a particle size of less than about 1.0 μm.

The carbon nanotubes comprise one of single walled carbon nanotubes, multi-walled carbon nanotubes and mixtures thereof. The carbon nanotubes have a length ranging from about 10 to about 1,000 μm, more preferably from about 10 to about 100 μm. Furthermore, the carbon nanotubes have an electrical conductivity from about 200 to about 10,000 S/cm, more preferably 1,000 S/cm. In a preferred embodiment, at least most of the carbon nanotubes are in with at least two or more activated carbon particles.

In one embodiment, the composite electrode material comprises a binder. The binder is one of a polymer binder, an ionic electrolyte, and combination of a polymer binder and ionic liquid. The activated carbon and carbon nanotubes are substantially distributed throughout the binder. Preferably, the activated carbon and carbon nanotubes are distributed in a substantially uniform manner throughout the binder. Furthermore, the binder substantially binds the activated carbon and carbon nanotubes together.

The polymer binder is selected from the group consisting essentially of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof. In the preferred embodiment, the polymer host comprises poly(vinylidene fluoride-co-hexafluoropropylene).

The ionic liquid electrolyte comprises an ionic liquid having oppositely charged ions. The ionic liquid has a melting point of no more than about 100 degrees Celsius, a decomposition temperature of at least about 200 degrees Celsius, a viscosity of no more than about 200 Cp, an ionic conductivity of at least about 0.1 mS/cm, and an electrochemical window of at least about 2 Volts.

The ionic liquid comprises:
(A) at least one cation selected from the group consisting essentially of the following compounds and mixtures thereof:

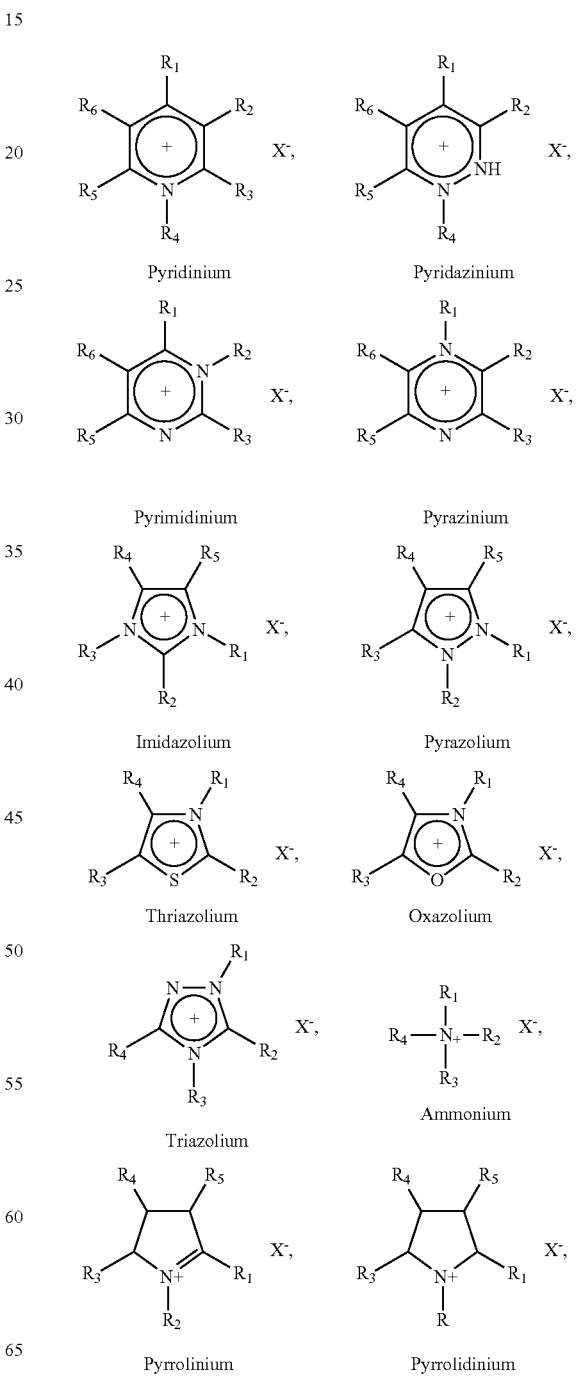

-continued

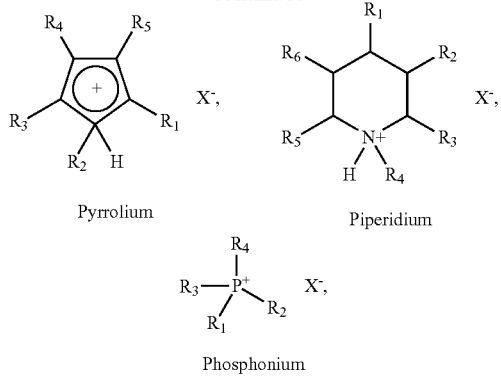

Pyrrolium    Piperidium

Phosphonium wherein $R_1$, $R_2$, $R_3$, $R_4$, $R_5$, and $R_6$ of the cationic components are identical or different and are selected from the group consisting essentially of:
(i) a hydrogen;
(ii) a halogen;
(iii) a hydroxyl;
(iv) an amine;
(v) a thiol;
(vi) a $C_1$ to $C_{25}$ straight-chain, branched aliphatic hydrocarbon radical;
(vii) a $C_5$ to $C_{30}$ cycloaliphatic hydrocarbon radical;
(viii) a $C_6$ to $C_{30}$ aromatic hydrocarbon radical;
(ix) a $C_7$ to $C_{40}$ alkylaryl radical;
(x) a $C_2$ to $C_{25}$ linear or branched aliphatic hydrocarbon radical having interruption by one or more heteroatoms, such as, oxygen, nitrogen or sulfur;
(xi) a $C_2$ to $C_{25}$ linear or branched aliphatic hydrocarbon radical having interruption by one or more functionalities selected from the group consisting essentially of:
(a') a carbonyl;
(b') an ester;
(c') an amide, where R' selected from the group consisting essentially of hydrogen, $C_1$-$C_{12}$ straight-chain, branched or cyclic alkane or alkene;
(d') a sulfonate;
(e') a sulfonamide, where R' selected from the group consisting essentially of hydrogen, $C_1$-$C_{12}$ straight-chain, branched or cyclic alkane or alkene;
(xii) a $C_2$ to $C_{25}$ linear or branced aliphatic hydrocarbon radical terminally functionalized by Cl, Br, F, I, NH, OH, $NH_2$, $NHCH_3$ or SH;
(xiii) a $C_5$ to $C_{30}$ cycloaliphatic hydrocarbon radical having at least one heteroatom selected from the group consisting essentially of O, N, S, and optionally substituted with at least one of the following Cl, Br, F, I, NH, OH, $NH_2$, $NHCH_3$ or SH;
(xiv) a $C_7$ to $C_{40}$ alkylaryl radical heteroatom selected from the group consisting essentially of O, N, S, and optionally substituted with at least one of the following:
(a") a $C_2$ to $C_{25}$ straight-chain, branched hydrocarbon radical substituted with at least one of the following Cl, Br, F, I, NH, OH, $NH_2$, $NHCH_3$ or SH;
(b") a $C_5$ to $C_{30}$ cycloaliphatic hydrocarbon radical substituted with at least one of the following Cl, Br, F, I, NH, OH, $NH_2$, $NHCH_3$ or SH
(c") a hydroxyl;
(d") an amine;
(e") a thiol;
(xv) a polyether of the type $-O-(-R_7-O-)_n-R_8$ or block or random type $-O-(-R_7-O-)_n-(-R_{7'}-O-)_m-R_8$, wherein at least of the following is true:
(a''') $R_7$ is a linear or branched hydrocarbon radical having from 2 to 4 carbon atoms;
(b''') $R_{7'}$ is a linear or branched hydrocarbon radical having from 2 to 4 carbon atoms; and
(c''') wherein n is from 1 to 40; and
(d''') $R_8$ is hydrogen, or a $C_5$ to $C_{30}$ straight-chain or branched hydrocarbon radical, or a $C_5$ to $C_3O$cycloaliphatic hydrocarbon radical, or a $C_6$ to $C_{30}$ aromatic hydrocarbon radical, or a $C_7$ to $C_{40}$ alkylaryl radical; and
(xvi) a polyether of the type $-O-(-R_7-O-)_n-C(O)-R_8$ or block or random type $-O-(-R_7-O-)_n-(-R_{7'}-O-)_m-C(O)-R_8$, wherein at least of the following is true:
(a'''') $R_7$ is a linear or branched hydrocarbon radical having from 2 to 4 carbon atoms;
(b'''') $R_{7'}$ is a linear or branched hydrocarbon radical having from 2 to 4 carbon atoms; and
(c'''') wherein n is from 1 to 40; and
(d'''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and
(B) at least one anion selected from the group consisting essentially of $F^-$; $Cl^-$, $Br^-$; $I^-$; $NO_3^-$; $N(CN)_2^-$; $BF_4^-$; $ClO_4^-$; $PF_6^-$; $RSO_3^-$; $RCOO^-$; where R is an alkyl group, substituted alkyl group, or phenyl group; $(CF_3)_2PF_4^-$, $(CF_3)_3PF_3^-$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2^-)_2N^-$, $CF_3CF_2(CF_3)_2CO^-$, $(CF_3SO_2^-)_2CH^-$, $(SF_5)_3C^-$, $(CF_3SO_2)_3C^-$, $[O(CF_3)_2C_2(CF_3)_2O]_2PO^-$, $(CF_3(CF_2)_7SO_3^-$, and mixtures thereof.

In a preferred embodiment, the ionic liquid comprises one of 1-ethyl-3-methylimidazolium bis(trifluoromethylsulfonyl)imide ([EMIM][Tf$_2$N]); 1-ethyl-3-methlimidazolium tetrifluoroborate ([EMIM][BF$_4$]); and mixtures thereof.

In optional embodiment, the electrode material comprises carbon black. The carbon black has a high crystalline orientation and an average particle size ranging from about 5 to about 500 nm. In one embodiment, the particle size ranges from about 15 to about 50 nm, an even more preferred embodiment the particle size ranges from about 20 to about 40 nm. The crystalline structure is a graphite-type crystalline structure having excellent electric conductivity. The carbon black particles form carbon black aggregates, the carbon black aggregate size is at least about 20 nm. In one embodiment, the carbon black aggregate size ranges from about 50 to about 2,000 nm.

The carbon black surface area ranges from about 30 to about 2,500 square meters per gram. In a preferred embodiment, the surface area of the carbon black is from about 65 to about 300 square meters per gram.

In one configuration, the electrode material comprises from about 0.5 wt % to about 95 wt % activated carbon, from about 0.5 wt % to about 95 wt % carbon nanotubes, from about 0.5 wt % to about 40 wt % polymer binder; from about 0 wt % to about 35 wt % ionic liquid electrolyte, and optionally carbon particles, and wherein the electrode material further comprises from about 0 wt % to about 30.0 wt % carbon black. Preferably, the electrode material comprises from about 60 to about 65 wt % activated carbon, from about 10 to about 25 wt % nanotubes, from about 7 to about 20 wt % polymer binder, from about 0 to about 10 wt % ionic liquid and optionally from about 0 to about 12 wt % carbon black.

In one embodiment, the electrode material has a surface resistance from about 2 to about 12 ohms/cm. In another embodiment, the electrode material has a specific surface area of from about 500 to about 2,000 m²/g.

In one embodiment, the solvent is an organic solvent or a mixture of organic solvents. The preferred organic solvent is a mixture of 1-methyl-2-pryyolidone and acetone. It can be appreciated that the mixture can contain other additives. The preferred organic solvent comprises about 75 parts 1-methyl-2-pryolidone and about 25 parts acetone.

In one embodiment, the substrate is a current collector. The current collector has opposing first and second surfaces. In one configuration, a slurry is contacted with the first surface to form a first coating on the first surface and with the second surface to form a second coating on the second surface. Preferably, the current collector is any highly conductive or superconductive material. More preferably, the current collector comprises one of aluminum, copper and nickel.

In one embodiment, the electrochemical device has one or both of the following performance properties cell voltage greater than about 3 V and an energy density greater than about 5 Wh/kg.

In a preferred embodiment, the ultracapacitor has first and second capacitor electrodes, with the second ionic liquid positioned between the first and second capacitor electrodes. In one configuration, the first and second ionic liquids are the same and in another configuration, they differ. In yet another configuration, the second ionic liquid comprises an ionic liquid gel polymer electrolyte. In another embodiment, the ultracapacitor can have a spiral capacitor electrode.

In one embodiment, the electrode material is positioned on a current collector and the current collector and electrode material are in contact. The current collector is any highly conductive or superconductive material. Preferred current collectors comprise aluminum, copper and nickel. In another embodiment, the current collector has opposing first and second surfaces, wherein a first electrode material is positioned on and in contact with the first surface and a second electrode material is positioned on and in contact with the second surface.

Another aspect of the present invention is a method for making an electrode for an electrochemical device. One step of the method is providing a polymeric binder and a solvent. Another step of the method is dissolving the polymeric binder in the solvent, to form a polymer solution. In another step of the method, a slurry is formed by adding, with or without mixing, pluralities of activated carbon particles and carbon nanotubes to the polymer solution. The method also includes a step of contacting the slurry with a substrate, wherein the slurry forms a coating on the substrate. A composite layer is formed on the substrate by removing the solvent to from the coating in yet another step of the method. In an optional series of steps, the slurry forms: a first coating on a first surface of the substrate and a second coating on a second surface of the substrate. The first and second surfaces of the substrate are in an opposing relationship.

As used herein, the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Alkyl" refers to monovalent alkyl groups preferably having from 1 to 8 carbon atoms and more preferably 1 to 6 carbon atoms. An alkyl group is typically a paraffinic hydrocarbon group, which may be derived from an alkane by dropping one hydrogen from the formula. Examples are methyl, ethyl, n-propyl, iso-propyl, n-butyl, iso-butyl, n-hexyl, and the like.

"Aryl" refers to an unsaturated aromatic carbocyclic group of from 6 to 14 carbon atoms having a single ring (for example phenyl) or multiple condensed rings (for example naphthyl or anthryl). Preferred aryls include phenyl, naphthyl, and the like.

The terms "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

An ionic liquid is generally understood to be a liquid composed almost entirely, if not completely, of ions. An ionic liquid commonly acts as both a salt and solvent or is said to be 100% salt and 100% solvent. Ionic liquids are liquid even at low temperatures (<100 degrees Celsius), cannot decompose at high temperatures (>400 degrees Celsius), and have relatively high viscosities.

"Polymer" refers to both polymers and copolymers. Copolymers include all polymers having more than one monomer type. Copolymers therefore include terpolymers, tetrapolymers, and other polymers with multiple monomer types.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIGS. 14A-14C are depictions of scanning electron microscope images of an electrodes comprising: 61.5 wt % activated carbon 20.5 wt % carbon black and 18.0 wt % polymer binder (prepared by Example A), FIG. 14A; 61.5 wt % activated carbon, 10.25 wt % mixed single/multi walled carbon nanotubes, 10.25 wt % carbon black and 18.0 wt % polymer binder, FIG. 14B; and 61.5 wt % activated carbon; 20.5 wt %, mixed single/multi walled carbon nanotubes and 18.0 wt % polymer binder, FIG. 14C;

DETAILED DESCRIPTION

Figure 4:
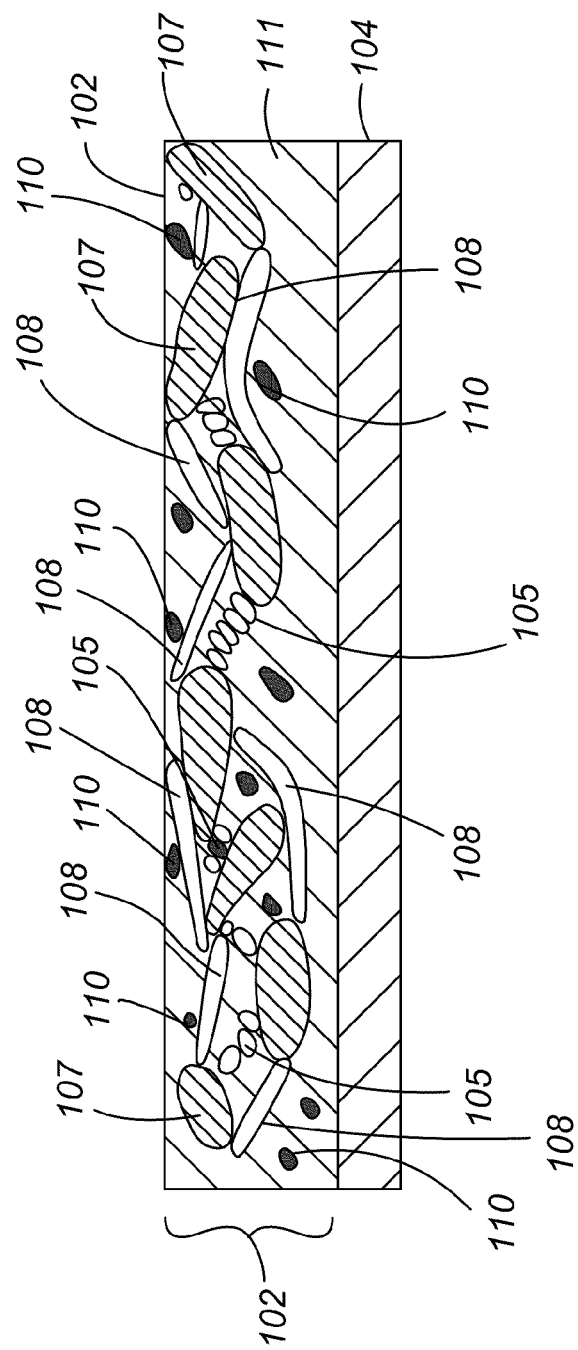
FIG. 4 is side view of an electrode according to an embodiment of the present invention.
Figure 5A:
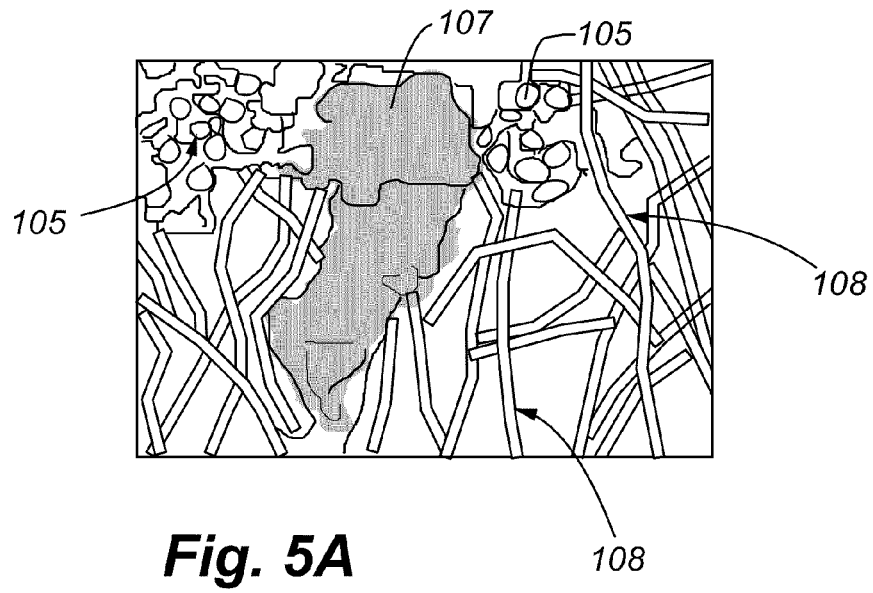
FIGS. 5A and 5B are depictions of scanning electron microscope images of electrodes according to various embodiments of the present invention.
Figure 5B:
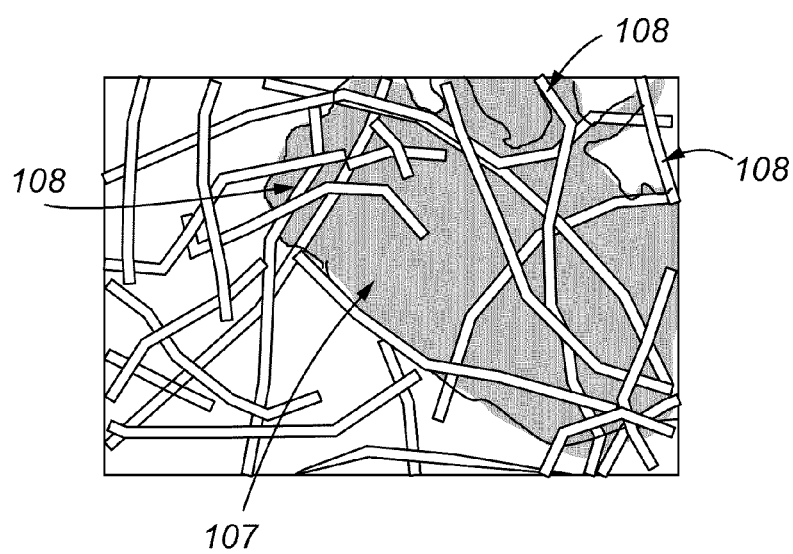

FIGS. 4, 5A and 5B depict a composite electrode 100 according to an aspect of the present invention. The composite electrode 100 comprises a current collector 104 and a composite electrode material 102. The composite electrode material 102 comprises an optional binder 111, an optional electrolyte 110, activated carbon 107 and optional carbon black 105 particles, and carbon nanotubes (CNTs) 108. The current collector 104 is any highly conductive or superconductive material. Examples conductive materials include without limitation metals (e.g., copper, aluminum, nickel, and stainless steel), superconductive ceramics, and the like. For ultracapacitors copper, aluminum and nickel are preferred current collectors.

In a preferred embodiment, the carbon nanotubes 108 form an entangled network. The activated carbon particles 107 and optional carbon black particles 105 are intermixed and/or dispersed within the entangled carbon nanotube network. Furthermore, most, if not all, of the activated carbon particles 107 and optional carbon black particles 105 are in contact with one or more carbon nanotubes 108. In a preferred embodiment, most, if not all, carbon nanotubes 108 are in contact with one or more activated carbon particles 107. In another embodiment containing the optimal carbon black particle, one or more carbon black particles 105 are in contact with one or more activated carbon particles 107 and/or one or more carbon nanotubes 108.

The activated carbon 107 (also referred to activated charcoal or activated coal) can be any activated carbon produced from any carbon-based source by any means known within the art. That is, the activated carbon 107 can be powder, granular, impregnated activated carbon or mixtures thereof. The activated carbon 107 can be produced by a carbonization, an activation/oxidation and/or a chemical activation processes.

While not wanting to be bound by theory, activated carbon used herein means a form of carbon that has been processed to make it extremely porous and thus have a large surface area available for contacting an electrolyte or chemical species (such as, a chemical species involved in an electrochemical reaction at an electrode). More specifically, the activated carbon 107 has a high degree of porosity and surface area (for example, about 500 square meters per gram).

Within the art, porosity is commonly classified as one of micropore (average pore size less than about 2 nm), mesopore (average pore size ranging from about 2 to about 50 nm), and macropore (average pore size more than about 50 nm). Aqueous electrolytes are electrochemically accessible to pore sizes greater than 0.5 nm. That is, large pores accessible to ions solvated by organic electrolytes.

The porosity of activated carbon is in the range of micropores. Electrolytes (especially organic electrolytes) have little, if any, accessibility to the small micropores of activated carbon. The micropores are blocked at high current densities, such as the current densities encountered during electrode charging and/or discharging.

For electrochemical devices, such as electrical double-layer capacitors, mesopores are preferred. While activated carbon has a high surface area, it has a low mesoporosity. In other words, activated carbon 107 is a poor material for supporting an electrical double layer. The low mesoporosity of activated carbon results in low electrolyte accessibility, low capacitance, and low electrochemical energy and power densities.

The activated carbon particles 107 can have any particle size. Preferred activated carbon particle size is about 100 μm or less, more preferred particle size is about 50 μm or less. In one embodiment, the activated carbon particles 107 comprise one or more of extruded, cylindrical shaped, granular, a powder or a fine granule activated carbon particles and mixtures thereof.

The carbon black 105 can be any carbon black produced from any carbon-based source by any means known within the art. While not wanting to be limited by example, the carbon black 105 can be produced by a furnace black, a channel black, a thermal black, a bone black, an acetylene black, and/or lampblack process. Preferably, the carbon black 105 is produced by one of furnace or acetylene black processes.

In one embodiment, the carbon black particles 105 have an average particle size ranging from about 5 to about 500 nm. In one embodiment, the particle size ranges from about 10 to about 350 nm. In a preferred embodiment, the carbon black particle size ranges from about 15 to about 50 nm, an even more preferred embodiment the particle size ranges from about 20 to about 40 nm.

The carbon black particles 105 can form carbon black aggregates 109. While not wanting to be bound by theory, the carbon black aggregate 109 is formed by one or more of van der Waals forces, electrical forces, and chemical interactions between two or more carbon black particles 105. The carbon black aggregate 109 size is at least about 20 nm. In one embodiment, the carbon black aggregate 109 ranges in size from about 50 to about 2,000 nm.

The carbon black 105 is an amorphous carbon having a high surface to volume ration. In one preferred embodiment, the carbon black has a high degree of crystalline orientation. The crystalline structure is a graphite-type crystalline structure. The graphite-structure provides excellent electric conductivity. In a preferred embodiment, the carbon black 105 has a high degree of graphite-structure and a high degree of aggregate formation. The high degree of graphite-structure and aggregate formation provides for excellent electrical conductivity. In a more preferred embodiment, the carbon black 105 is produced in an acetylene black process. The acetylene black process produces a carbon black 105 having a high degree of graphite-structure and aggregate formation.

The carbon black 105 has a surface to volume ration about equal to or less than the activated carbon 107. The carbon black 105 surface area ranges from about 30 to about 2,500 square meters per gram. In one embodiment, the carbon black surface area ranges from about 50 to about 1,500 square meters per gram. In a preferred embodiment, the surface area of the carbon black is from about 65 to about 300 square meters per gram.

In one embodiment, the carbon black 105 is selected from the group consisting of a carbon black having an ASTM designation Number of one of N110, N220, N300, N300, N330, N683, N770, N880, N990 and mixtures thereof.

The carbon nanotubes 108 are generally categorized as single-wall carbon nanotubes (SWNT) and multi-wall carbon nanotubes (MWNT). Single-wall carbon nanotubes are fullerenes consisting essentially of $sp^2$-hybridized carbon typically arranged in hexagons and pentagons. The single-wall carbon nanotubes form carbon cylindrical structures, known commonly as "buckytubes." The SWNTs have extraordinary properties, including high electrical and thermal conductivity, as well as high strength and stiffness. The carbon nanotube can have opened, closed, or a mixture of opened and closed ends.

Multi-wall carbon nanotubes are nested single-wall carbon cylinders formed by rolling up additional graphene tubes around a core of an SWNT and possess many properties similar to single-wall carbon nanotubes.

In a preferred embodiment, the carbon nanotubes 108 comprise a mixture of single- and multi-walled carbon nanotubes. In one configuration, the mixture of single- and multi-walled carbon nanotubes, comprises from about 0 to about 100 wt % single walled carbon nanotubes and from about 0 to abut 100 wt % multi-walled carbon nanotubes. In a more preferred configuration, the mixture single- and multi-walled carbon nanotubes comprises from about 25 to about 75 wt % single walled carbon nanotubes and from about 25 to abut 75 wt % multi-walled carbon nanotubes. In an even more preferred configuration, the mixture single- and multi-walled carbon nanotubes comprises from about 40 to about 60 wt % single walled carbon nanotubes and from about 40 to abut 60 wt % multi-walled carbon nanotubes.

The carbon nanotubes 108 can be made by any known method, such as by gas-phase synthesis from high temperature, high pressure carbon monoxide, catalytic vapor deposition using carbon-containing feed stocks and metal catalyst particles, laser ablation, arc method, or any other method for synthesizing single-wall carbon nanotubes. Preferred methods are chemical vapor deposition to grow random carbon nanotubes and plasma-enhanced chemical vapor deposition to grow aligned carbon nanotubes. The carbon nanotubes 108 can be used as synthesized or after purification. Metals, such as Group VIB and/or VIIIB, are possible catalysts for the synthesis of carbon nanotubes. SWNTs and MWNTs can provide high electrical conductivity, high surface area, high mesoporosity, and high electrolyte accessibility. As will be appreciated, the carbon nanotube mesopores (2 to 50 nm) are accessible by electrolytes (especially organic electrolytes) and contribute to capacitance in an electrical double layer capacitor.

Compared to high-surface-area activated carbons, carbon nanotubes 108 possess moderate specific surface area (about 400 $m^2/g$ for randomly entangled carbon nanotubes). Nevertheless, carbon nanotubes 108 can have high capacitances of up to 200 F/g, while activated carbons have capacitances ranging from about 5 to about 90 F/g. Carbon materials (such as activated carbon) have charge densities from about 20 to about 50 $\mu F/cm^2$. The carbon nanotubes (having specific surface area of about 357 $m^2/g$) have capacitances of at least about 70 F/g and more preferably from about 70 to about 200 F/g.

The carbon nanotubes 108 can have diameters ranging from about a few Angstroms to about tens of nanometers and lengths from about a few nanometers to about 10 centimeters. The carbon nanotubes 108 can have semiconducting or metallic conductivities depending on the carbon nanotube 108 diameter and helicity of the arrangement of the graphite rings forming the carbon nanotube 108. In one embodiment, the carbon nanotubes 108 have conductivities up to about 10,000 S/cm.

The carbon nanotube length can influence the surface area of the carbon nanotube and charge storage capability (capacitance) of carbon nanotube-based electrodes. The carbon nanotube length is preferably at least about 75 microns and more preferably range from about 150 to about 200 microns.

In contrast to activated carbon 107, carbon nanotubes 108 have a high mesoporosity and a high degree of electrolyte accessibility. The high degree of mesoporosity provides for faster charge and/or discharge rates than activated carbon. In other words, electrodes containing carbon nanotubes can support greater current densities than activated carbon. The fast charge and/or discharge rate for carbon nanotubes provide high capacitance at high frequencies. The carbon nanotube capacitors of the present invention can support charging and/or discharging rates at frequencies as high at about 100 Hz. The high frequency response for carbon nanotubes electrodes supports applications requiring high power performance.

Returning to FIGS. 4 and 5A-5C, the optional binder can comprise one of a polymer, an ionic liquid electrolyte 110 or a mixture thereof. The polymer binder can be any thermoplastic or thermosetting polymer having a melting point of at least about 60 degrees Celsius and a high solubility in a selected low boiling point (organic) solvent. When thermosetting polymers are used, the polymer preferably cross-links at a temperature below the decomposition temperature of the ionic liquid and/or in response to ultraviolet light or heat. Thermosetting polymers, when cross-linked, form three-dimensional polymer networks through which the ionic liquid can move. Cross-linked polymers do not crystallize and have the advantage of superior dimensional stability and mechanical strength. When thermoplastic polymers are used, the polymer preferably melts at a temperature above the decomposition temperature of the ionic liquid electrolyte 110.

Figure 6:
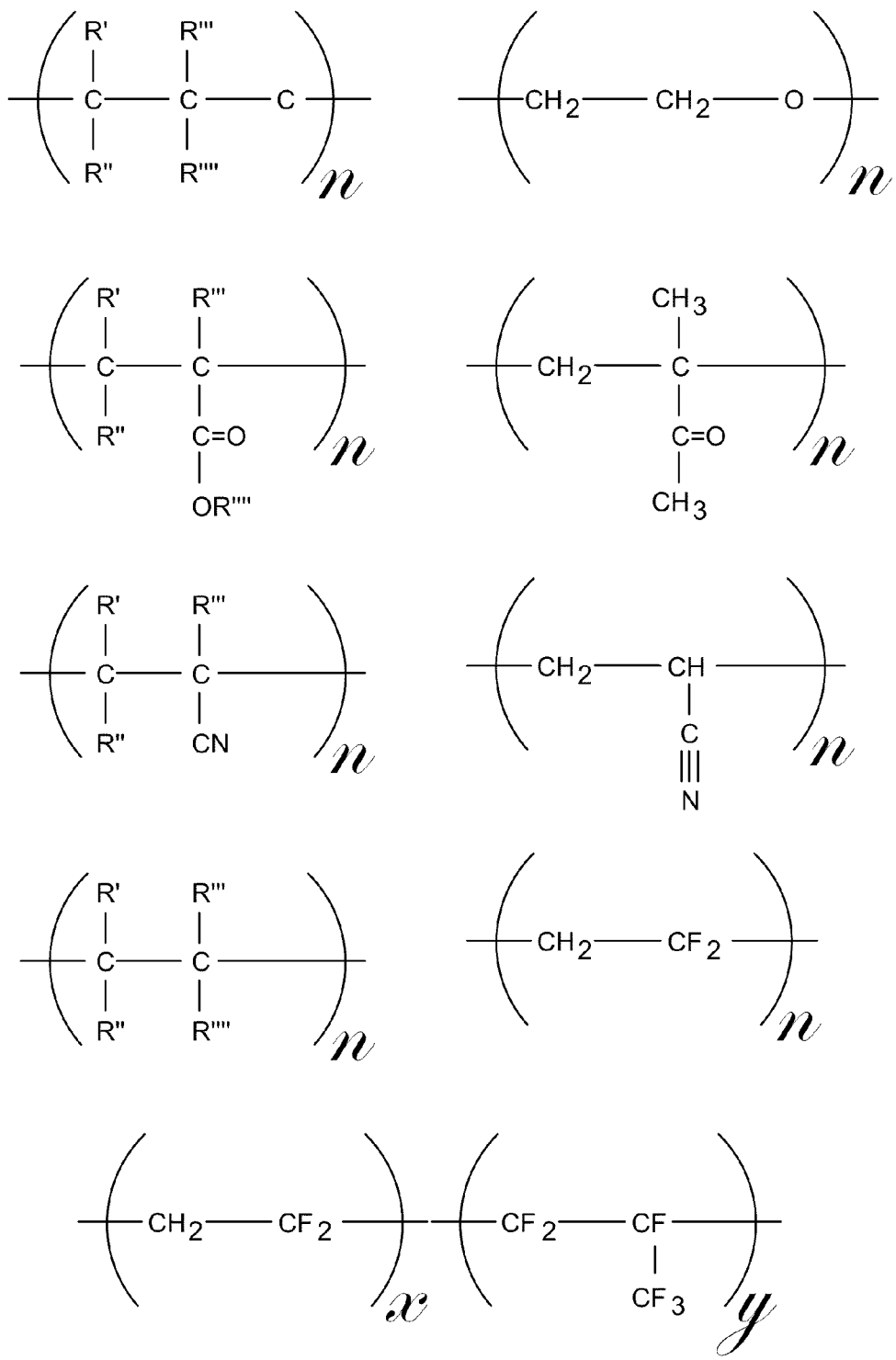
FIG. 6 shows examples of suitable binders.

FIG. 6 depicts examples of suitable polymers. The polymer binder can be any suitable high molecular weight polymer. Examples of suitable polymers include homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof. In a preferred embodiment, the polymer binder comprises poly(vinylidene fluoride-co-hexafluoropropylene) (PVdF-HFP).

Particularly preferred polymer binders include poly(ethylene oxide) (PEO), polyacrylonitrile (PAN), poly(methyl methacrylate) (PMMA), poly(vinylidene fluoride) (PVdF), and poly(vinylidene fluoride-co-hexafluoropropylene) (PVdF-HFP), with PAN and PVdF-HFP being even more preferred. PAN and PVdF, have relatively high thermal stability. In addition, PVdF-based polymers are electrochemically stable due to the strongly electron-withdrawing functional group —C—F. PVdF co-polymerized with hexafluoropropylene (PVdF-HFP), can be used to improve the gel properties of the polymer electrolytes because of its greater solubility in organic solvents, lower crystallinity, and lower glass transition temperature than the PVdF polymer alone in gels.

The optional electrolyte 110 can be any electrolyte or gel polymer electrolyte. Preferably, the electrolyte 110 is an ionic liquid. The ionic liquid can be any suitable electrochemically stable, water miscible and/or immiscible (with water immiscible being preferred) ionic liquid having a relatively low melting point (e.g. preferably less than about 100° C. and more preferably from about −5 to about −125° C.). Preferably, the ionic liquid has a relatively high thermo-decomposition temperature (e.g., remain substantially thermally stable at temperatures of about 400° C. or less), a suitable hydrophobic:hydrophilic ratio, a low viscosity (e.g., preferably no more than about 200 Cp and even more preferably ranging from about 20 to about 150 Cp), a relatively high ionic conductivity (e.g. preferably at least about 0.01 at about 25° C., more preferably from about 1 to about 20 mS/cm) and wide electrochemical window (e.g., preferably at least about 2 volts and more preferably at least about 4 volts).

Figure 7:
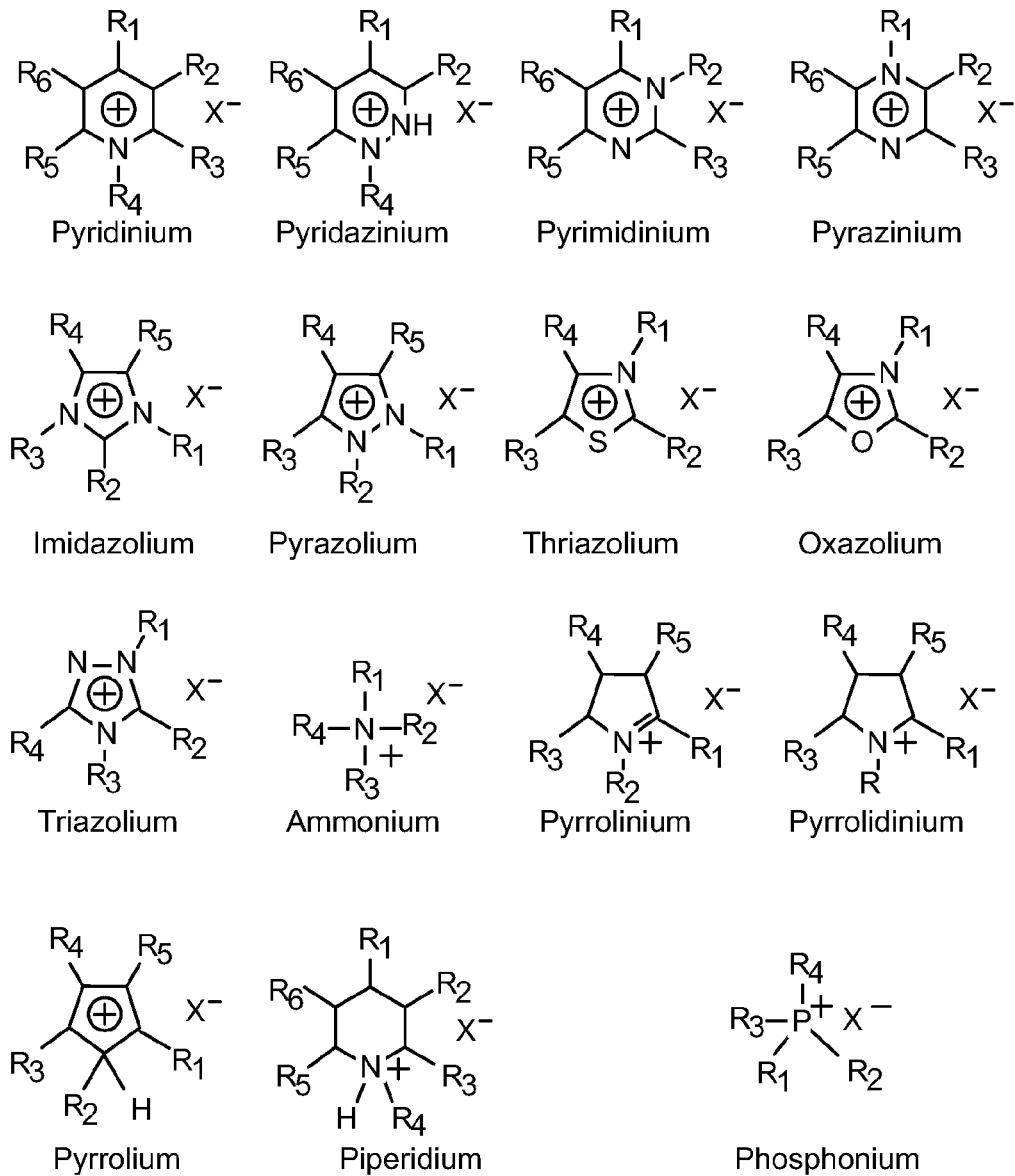
FIG. 7 shows examples of ionic liquids based on various monocations.

FIG. 6 shows examples of suitable ionic liquids based on various monocations, while FIG. 7 shows examples of suitable ionic liquids based on polycations. The $R_1$, $R_2$, $R_3$, $R_4$, $R_5$, and $R_6$ of the cationic components are identical or different and are preferably selected from the group consisting essentially of:

(a) a hydrogen (—H)
(b) a halogen (—Cl, —Br, —I, or —F)
(c) a hydroxyl (—OH)
(d) an amine (—NH$_2$)
(e) a thiol (—SH)
(f) a $C_1$ to $C_{25}$ straight-chain, branched aliphatic hydrocarbon radical
(g) a $C_5$ to $C_{30}$ cycloaliphatic hydrocarbon radical
(h) a $C_6$ to $C_{30}$ aromatic hydrocarbon radical
(i) a $C_7$ to $C_{40}$ alkylaryl radical
(j) a $C_2$ to $C_{25}$ linear or branched aliphatic hydrocarbon radical having interruption by one or more heteroatoms, such as, oxygen, nitrogen or sulfur (k) a $C_2$ to $C_{25}$ linear or branced aliphatic hydrocarbon radical having interruption by one or more functionalities selected from the group consisting essentially of:
   a. a carbonyl (—C(O)—)
   b. an ester (—C(O)O—)
   c. an amide (—C(O)NR'—), where R' selected from the group consisting essentially of hydrogen, $C_1$-$C_{12}$ straight-chain, branched or cyclic alkane or alkene
   d. a sulfonate (—S(O)$_2$O—)
   e. a sulfonamide (—S(O)$_2$NR'—), where R' selected from the group consisting essentially of hydrogen, $C_1$-$C_{12}$ straight-chain, branched or cyclic alkane or alkene
(l) a $C_2$ to $C_{25}$ linear or branced aliphatic hydrocarbon radical terminally functionalized by Cl, Br, F, I, NH, OH, $NH_2$, $NHCH_3$ or SH
(m) a $C_5$ to $C_{30}$ cycloaliphatic hydrocarbon radical having at least one heteroatom selected from the group consisting essentially of O, N, S, and optionally substituted with at least one of the following Cl, Br, F, I, NH, OH, $NH_2$, $NHCH_3$ or SH
(n) a $C_7$ to $C_{40}$ alkylaryl radical heteroatom selected from the group consisting essentially of O, N, S, and optionally substituted with at least one of the following
   a. a $C_2$ to $C_{25}$ straight-chain, branched hydrocarbon radical substituted with at least one of the following Cl, Br, F, I, NH, OH, $NH_2$, $NHCH_3$ or SH
   b. a $C_5$ to $C_{30}$ cycloaliphatic hydrocarbon radical substituted with at least one of the following Cl, Br, F, I, NH, OH, $NH_2$, $NHCH_3$ or SH
   c. a hydroxyl
   d. an amine
   e. a thiol
(o) a polyether of the type —O—(—$R_7$—O—)$_n$—$R_8$ or block or random type —O—(—$R_7$—O—)$_n$—(—$R_{7'}$—O—)$_m$—$R_8$ where
   a. $R_7$ is a linear or branched hydrocarbon radical having from 2 to 4 carbon atoms
   b. $R_7$ is a linear or branched hydrocarbon radical having from 2 to 4 carbon atoms
   c. n is from 1 to 40
   d. $R_8$ is hydrogen, or a $C_5$ to $C_{30}$ straight-chain or branched hydrocarbon radical, or a $C_5$ to $C_3$Ocycloaliphatic hydrocarbon radical, or a $C_6$ to $C_{30}$ aromatic hydrocarbon radical, or a $C_7$ to $C_{40}$ alkylaryl radical
(p) a polyether of the type —O—(—$R_7$—O—)$_n$—C(O)—$R_8$ or block or random type —O—(—$R_7$—O—)$_n$—(—$R_{7'}$—O—)$_m$—C(O)—$R_8$ where
   a. $R_7$ is a linear or branched hydrocarbon radical having from 2 to 4 carbon atoms
   b. $R_7$ is a linear or branched hydrocarbon radical having from 2 to 4 carbon atoms
   c. n is from 1 to 40
   d. $R_8$ is hydrogen, or a $C_5$ to $C_{30}$ straight-chain or branched hydrocarbon radical, or a $C_5$ to $C_3$Ocycloaliphatic hydrocarbon radical, or a $C_6$ to $C_{30}$ aromatic hydrocarbon radical, or a $C_7$ to $C_{40}$ alkylaryl radical.

The anionic component is preferably selected from the group consisting essentially of:
(a) halides, i.e., chloride, bromide, and iodide, preferably iodide
(b) phosphates
(c) halophosphates, preferably hexafluorophosphate
(d) alkylated phosphates
(e) nitrate
(f) sulfates, i.e., hydrogen-sulfate
(g) alkyl sulfates, preferably octyl sulfate
(h) aryl sulfates
(i) perfluorinated alkyl sulfates
(j) perflourinated alkyl ether sulfates
(k) halogenated alkyl sulfates
(l) perfluorinated aryl sulfates
(m) perflourinated aryl ether sulfates
(n) sulfonates
(o) alkylsulfonates
(p) arylsulfonates
(q) perfluorinated alkyl- and arylsulfonates, preferably triflate (or trifluoromethansulfonate)
(r) perfluorinated alkyl ether and aryl ether sulfonates
(s) halogenate alkyl- and arylsulfonates,
(t) perchlorate
(u) tetrachloroaluminate
(v) tetrafluoroborate
(w) alkylated borates, preferably $B(C_2H_5)_3C_6H_{13}^-$
(x) tosylate
(y) saccharinate
(z) alkyl carboxylates, and
(aa) bis(perfluoroalkylsulfonyl)amide anions, preferably the bis(trifluoromethylsulfonyl)amide anion, or is
(bb) a mixture of two or more of these anionic species.

In one preferred embodiment, the ionic liquid has halogen-free anions selected from the group consisting essentially of phosphate, alkyl phosphates, nitrate, sulfate, alkyl sulfates, aryl sulfates, sulfonate, alkylsulfonates, arylsulfonates, alkyl borates, tosylate, saccharinate, and alkyl carboxylates, particular preference being given to alkyl sulfates, in particular octyl sulfate, and to tosylate.

Figure 8:
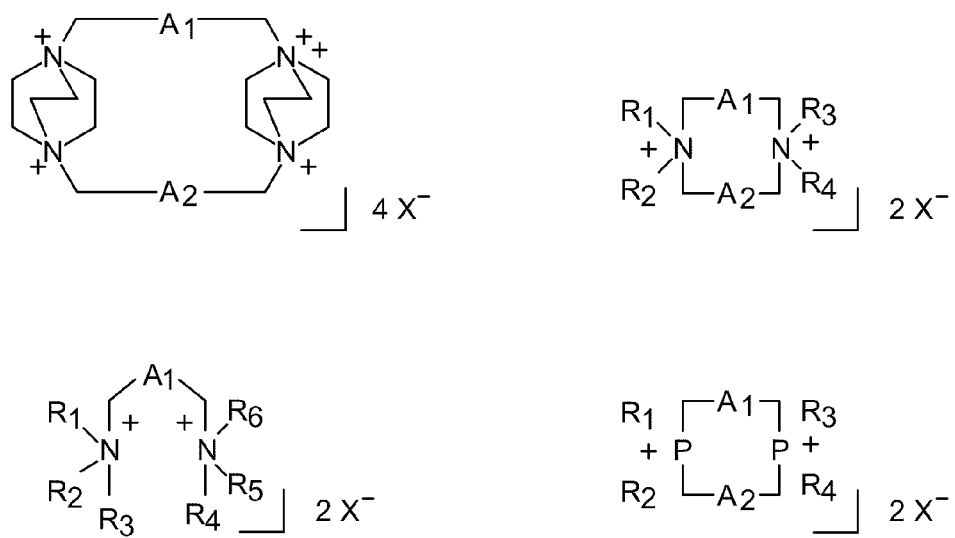
FIG. 8 shows examples of ionic liquids based on various polycations.

Ionic liquids electrolytes 110 based on polycations are formed when monocations are joined together; FIG. 8 shows monocations joined to form polycationic ring structures, where $A_1$ and $A_2$ are alkylene groups and substituted alkylene groups. The anion $X^-$ includes, without limitation, but is not limited to, $F^-$; $Cl^-$, $Br^-$; $I^-$; $NO_3^-$; $BF_4^-$; $N(CN)_2^-$; $BF_4^-$; $ClO_4^-$; $PF_6^-$; $RSO_3^-$; $RCOO^-$, where R is an alkyl group; substituted alkyl group; phenyl group; $(CF_3)_2PF_4^-$, $(CF_3)_3PF_3^-$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2^-)_2N^-$, $CF_3CF_2(CF_3)_2CO^-$, $(CF_3SO_2^-)_2CH^-$, $(SF_5)_3C^-$, $(CF_3SO_2SO_2)_3C^-$, $[O(CF_3)_2C_2(CF_3)_2O]_2PO^-$, and $CF_3(CF_2)_7SO_3^-$. Preferably, the ionic liquid is a composition having at least one cation selected from the group consisting essentially of pyridinium, pyridazinium, pyrimidinium, pyrazinium, imidazolium, pyrazolium, thiazolium, oxazolium, triazolium, ammonium, pyrrolidinium, pyrrolinium, pyrrolium, and piperidinium and at least one anion selected from the group consisting essentially of $F^-$; $Cl^-$, $Br^-$; $I^-$; $NO_3^-$; $N(CN)_2^-$; $BF_4^-$; $ClO_4^-$; $PF_6^-$; $RSO_3^-$; $RCOO^-$; where R is an alkyl group, substituted alkyl group, or phenyl group; $(CF_3)_2PF_4^-$, $(CF_3)_3PF_3^-$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2^-)_2N^-$, $CF_3CF_2(CF_3)_2CO^-$, $(CF_3SO_2^-)_2CH^-$, $(SF_5)_3C^-$, $(CF_3SO_2)_3C^-$, $[O(CF_3)_2C_2(CF_3)_2O]_2PO^-$, and $(CF_3(CF_2)_7SO_3^-$.

Figure 9:
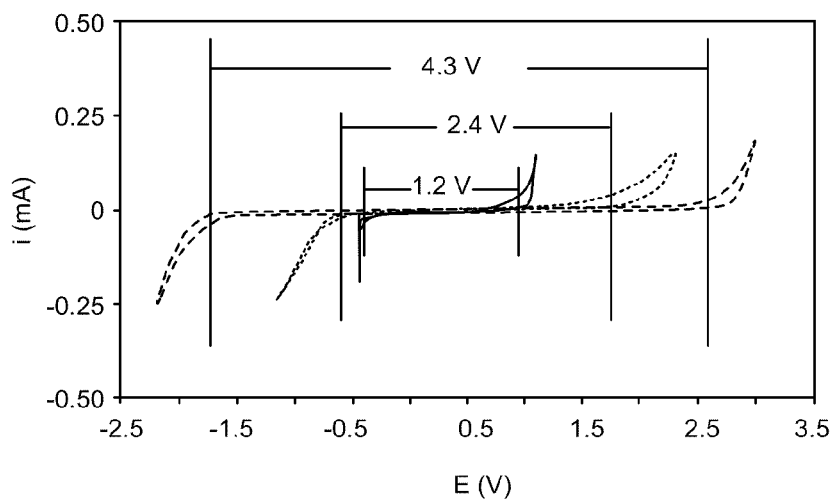
FIG. 9 is a family of cyclic voltamograms of different electrolytes obtained in an electrochemical cell having a platinum working (diameter of about 1.6 mm) electrode, a platinum wire counter electrode, and a silver quasi-reference electrode collected at a scan rate of about 20 mv/sec, the electrolytes comprising 38 wt % $H_2SO_4$ (1.2 volt window), 1 M $Et_4NBF_4$/acetonitrile (2.4 volt window) and [EMIM] [$Tf_2N$] (4.3 volt window)

A comparison of aqueous, organic and ionic liquid 110 electrolytes physical properties is shown in Table I. While aqueous electrolytes are highly conductive, due to their highly ionic character, they are also volatile and have a narrow electrochemical window, see FIG. 9. The narrow electrochemical voltage window for aqueous electrolytes limits the energy and power densities to low values. Furthermore, strongly acidic and basic aqueous electrolytes are corrosive and have health and safety problems.

Organic electrolytes offer advantages over aqueous electrolytes. Organic electrolytes have larger electrochemical windows, therefore, they have a larger voltage window and greater energy and power densities than aqueous electrolytes. However, the larger voltage window for organic electrolytes is still too narrow for high performance electrochemical devices, such as ultracapacitors. Furthermore, organic electrolytes have more deleterious health and safety problems than aqueous electrolytes. Organic electrolytes are more volatile, flammable, and toxic than aqueous electrolytes, and in some circumstances organic electrolytes are explosive.

TABLE 1

Comparison between aqueous, organic, and ionic liquid electrolytes

| Property | Aqueous | Organic[a] | Ionic Liquid |
|---|---|---|---|
| Ionic conductivity (S/cm) | $10^{-2}$ | $10^{-3}$ | $10^{-3}$ |
| Electrochemical window (V) | 1.2 | 2.5 | 4 |
| Vapor pressure at 25° C. (mm Hg) | 23.8 | >81.81 | Negligible |
| Volatility | High | High | Negligible |
| Viscosity (cp) | Low (0.89) | Medium (0.33) | High (>20) |
| Flammability | Non-flammable | Flammable | Non-flammable |
| Thermal stability | Poor | Poor | Excellent |
| Liquid range (° C.) | 0~100 | −43.84~81.6 | −100~500 |

[a]Acetonitrile (ACN) as the example.

Ionic liquids have a larger electrochemical voltage window (that is, about 4 volts or more) than organic and/or aqueous electrolytes (that is, about 2.5 volts or less). Electrochemical devices fabricated with ionic liquids having the larger electrochemical voltage window not only can have a greater cell voltage, the devices can have greater energy and power densities.

Ionic liquids also remain liquid over a wider temperature range than aqueous and organic electrolytes. Ionic liquids have a liquid temperature range from about −100 to about 500° C. This wider liquid temperature range for ionic liquids allows for one or more of a greater operational temperature range, greater thermal stability, lower volatility, and lower vapor pressure. The high electrical conductivity and improved charge transport capability of ionic liquids can compensate for their higher viscosity.

During electrochemical charging aqueous and organic electrolytes suffer from electrolyte depletion. Electrolyte depletion is a decrease in ionic concentration in the bulk electrolyte due to ions concentrated at the electrode/electrolyte interface. The decreased bulk ionic concentration during charging results in an increased cell resistance and a lower maximum power density. Ionic liquids are considered to have a constant, high ionic concentration. Therefore, they are less susceptible to electrolyte depletion than aqueous and organic electrolytes.

The high ionic concentration substantially reduces and/or eliminates electrolyte depletion during one or both of charging and discharging of the electrochemical device. The substantial reduction and/or elimination of electrolyte depletion substantially increases the power density of the electrochemical device.

Two imidazolium ionic liquids having large electrochemical windows, high ionic conductivities, low viscosities, low melting points, and high decomposition temperatures are 1-ethyl-3-methylimidazolium bis(trifluoromethylsulfonyl) imide and [EMIM][Tf$_2$N] and 1-ethyl-3-methylimidazolium tetrafluoroborate [EMIM][BF$_4$] (see Table 2). The low volatility, low flammability, and thermal stability of the [EMIM][Tf$_2$N] and [EMIM][BF$_4$] ensure safe operation of the electrochemical device. Furthermore, [EMIM][Tf$_2$N] and [EMIM][BF$_4$] are liquids (that is, they are solvents) with a 100% ionic content. Furthermore, [EMIM][Tf$_2$N] is preferred to [EMIM][BF$_4$]. [EMIM][Tf$_2$N] has a larger electrochemical window, higher decomposition temperature, and water immiscibility which makes it more suitable for higher performance and longer life-cycle ultracapacitors.

TABLE 2

Physical properties of two imidazolium ionic liquids

| Property | Ionic liquid | |
|---|---|---|
| | 1-Ethyl-3-methylimidazolium bis(trifluoromethylsulfonyl)-imide[EMIM][Tf$_2$N] | 1-Ethyl-3-methylimidazolium tetrafluoroborate [EMIM][BF$_4$] |
| Structure | (structure shown) | (structure shown) |
| Ionic conductivity (S/cm) | $4.8 \times 10^{-3}$ | $7.6 \times 10^{-3}$ |
| Electrochemical window (V) | 4.28 | 4.05 |
| Vapor pressure at 25° C. (mm Hg) | Negligible | Negligible |
| Viscosity (cp, at 20° C.) | 28 | 38 |
| Flammability | Non-flammable | Non-flammable |
| Liquid range (° C.) | −15~400 | 14~350 |
| Water miscibility | Immiscible | Miscible |
| Anion size (nm)[a] | 0.51 | 0.45 |
| Cation size (nm)[a] | 0.6 | 0.6 |

[a]Ionic diameters, calculated by Hyperchem ® software

The ionic liquid can include additives to provide desirable electrochemical properties. By way of example, viscosity reducers can be added to the ionic liquid to lower viscosity and increase ionic conductivity. Examples of potential viscosity reducers include propylene carbonate, ethylene carbonate, dimethylformamide, and acetonitrile.

In a preferred embodiment, the composite electrode material 102 comprises activated carbon 107, carbon nanotubes 108 and a mixture of polymer binder 111 and ionic liquid electrolyte 110. In a preferred embodiment, the polymer binder 111 ionic liquid electrolyte 110 mixture has a mass ratio of the ionic liquid electrolyte 110 to polymer binder ranging from about 0.01:1 to about 1:0.01 and a more preferred from about 0.1:1 to about 10:1. In an even more preferred embodiment, the ionic liquid electrolyte 110 to polymer binder mass ration is about 1:1. The ionic liquid has various anions and/or cations. In one preferred embodiment, the ionic liquid electrolyte 110 plasticizes the polymer binder 111. A single ionic liquid electrolyte or a mixture of differing ionic liquid electrolytes can be combined with the polymer binder 111.

In one embodiment, the ionic liquid electrolyte 110 can bind the activated carbon particles 107 and the carbon nanotubes 108. That is, the composite electrode material 102 comprises activated carbon particles 107, carbon nanotubes 108 and ionic liquid electrolyte 110.

One preferred embodiment, of the present invention is a three-component composite electrode containing carbon nanotubes having high electrical conductivity, high mesoporosity, high specific surface area, and low catalyst content. In a more preferred embodiment, the carbon nanotubes have one or more of a electrical conductivity from about 200 S/cm to about 10,000 S/cm, a meosporosity from about 2 nm to about 50 nm, and a specific surface area from about 100 $m^2/g$ to about 1000 $m^2/g$. Carbon nanotubes having large specific surface areas are preferred for their greater charge storage capacities. That is, the greater the carbon nanotube specific surface area, the greater charge storage capacity of the composite electrode. The ability of the composite electrode material 102 to deliver charge increases with increases in the electrical conductivity of the carbon nanotube. Similarly, the ability of composite electrode material 102 to deliver charge increases with increases in the porosity of the carbon nanotube.

In one embodiment, the composite electrode material 102 comprises from about 0.5 wt % to about 95 wt % activated carbon, in a preferred embodiment from about 40 wt % to about 80 wt % activated carbon. Even more preferred, the composite electrode material 103 comprises from about 50 wt % to about 70 wt % activated carbon and yet even more from about 60 to about 65 wt % activated carbon.

In another embodiment, the composite electrode material 103 comprises from about 0 wt % to about 30.0 wt % carbon black, more preferred from about 0 wt % to about 12 wt % carbon black. Even more preferred, the composite electrode material 103 comprises less than about 5 wt % carbon black. Yet even more preferred, the composite electrode material 102 comprises less than about 0.05 wt % carbon black. In one embodiment, the composite electrode 100 contains little, if any, added carbon black 105. That is, the composite electrode 100 contains no added carbon black 105.

In yet another embodiment, the composite electrode material 102 comprises a binder. In a preferred embodiment, the composite electrode material comprises from about 0 wt % polymer binder to about 40 wt %, even more preferred ranging from about 5 wt % to about 20 wt % polymer binder.

In still yet another embodiment, the composite electrode material 102 comprises from about 0 wt % ionic liquid to about 65 wt % ionic liquid, in a more preferred embodiment from about 2 wt % to about 20 wt % ionic liquid. In an even more preferred embodiment, the composite electrode material 102 comprises from about 5 wt % to 10 wt % ionic liquid.

In a more preferred embodiment, the carbon nanotubes have one or more of: an electrical conductivity greater than about 1000 S/cm; a pore size from about 2 nm to about 50 nm; a specific surface area greater than about 400 $m^2/g$; and a catalyst content less than about 1 wt %. Furthermore, composite electrodes comprising carbon nanotubes having a higher degree of electrical conductivity and/or mesoporosity can contain a greater weight percent of activated carbon, compared to electrodes of the prior art containing carbon black and activated carbon.

The amount of residual catalyst contained within in the carbon nanotubes can affect the pseduocapacitance of the electrochemical capacitor. The amount of residual catalyst contained in the carbon nanotube can enhance the energy density of the electrochemical capacitors. However, compared to double-layer capacitance, pseudocapacitance charging and/or discharging is slower and can, thereby, limit power density. In one embodiment, residual catalyst from the nanotube fabrication process is removed by refluxing the carbon nanotubes in a mineral acid (such as, 37% HCl) at 80° C. for 12 hours, preferably with stirring. At the conclusion of the refluxing process, the acid solution is cooled to room temperature and poured into an ice-water bath. The resulting suspension is filtered through a 0.45-μm membrane (such as, a nylon membrane filter), washed repeatedly with pure water, and dried overnight in a vacuum.

In another embodiment, the carbon nanotubes are prepared by decomposition of hydrocarbons at about 1,000° C. in the presence of metallic nanoparticles (e.g. Fe). More specifically, the carbon nanotubes are prepared by pyrolysis of iron (II) phthalocyanine at a temperature of about 1,100° C. under a flow of $Ar/H_2$ (1:1 to 1:2 v/v, 20-40 $cm^3/min$). Nanotube length can be controlled by nanotube growth conditions, such as, deposition time and flow rate. Furthermore, nanotube diameter can be controlled by deposition temperature and flow rate, preferably during the initial stage of nanotube growth.

In yet another embodiment, adhesion of the three-component composite to the current collector 104 (such as, but not limited to an aluminum foil collector) is enhanced by one or more of the three-component composition (e.g., viscosity) and/or process of applying the composition to the current collector 104. (e.g., application speed and drying conditions).

In another embodiment, the ionic liquid comprises an ionic liquid gel polymer electrolyte and/or polymer host. In a preferred embodiment, the ionic liquid gel polymer electrolyte comprises one or more of the gel polymer electrolytes and/or polymer hosts disclosed in U.S. Published Patent Application No. 2008/0192407 hereby incorporated by this reference. Furthermore, the U.S. Published Patent Application No. 2008/0192407 discloses a method of etching the carbon nanotubes and opening one or more ends of the carbon nanotubes which is also hereby incorporated by this reference.

One configuration of the present invention is a three-component composite electrode material comprising activated carbon 107, carbon nanotubes 108, a polymer binder 111 and an ionic liquid electrolyte 110. The three-component composite electrode material has a porous structure. The electrolyte of the electrochemical device can impregnate the unique porous structure of the composite electrode material. In other words the electrolyte (such as an ionic liquid and/or ionic liquid gel polymer electrolyte) can form as least some of the composite electrode structure. Stated another way, the electrolyte is integrated in the porous structure of the composite electrode material of the electrochemical device. In other words, the electrochemical device has a reduced resistance at the electrode/electrolyte interface. In another configuration, the three-component composite electrode material coated on opposing sides of the current collector to form a double-sided electrode. Compared to single-sided electrodes, the double-sided electrode has a higher energy capacity. In one configuration, the double-sided electrodes can be fabricated in a bicell configuration. The bicell configuration improves energy capacity and reduces packaging weight and cost.

Figure 10:
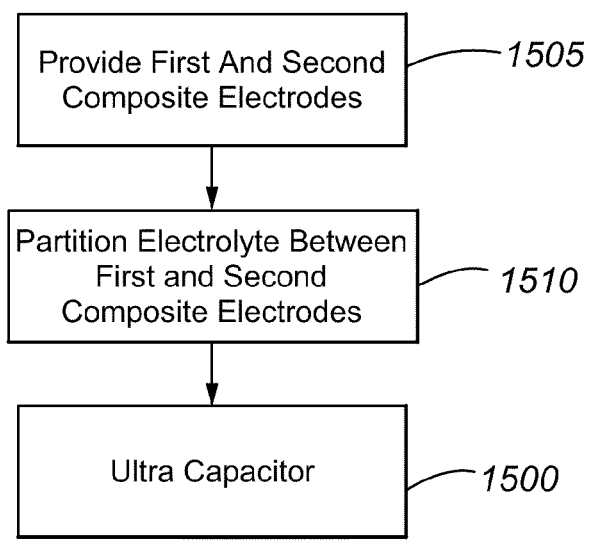
FIG. 10 is a flowchart for a method for making an ultracapacitor according to an embodiment of the present invention.

FIG. 10 depicts the process for assembling an ultracapacitor 1500 according to an embodiment of the invention.

In step 1505, first 1501 and second 1502 composite electrode materials, comprising, as described above, are provided. Each of the first 101 and second 1502 composite electrode materials comprise the carbon nanotube composite material 102 positioned on and in contact with the current collector 104.

In step 1510, an electrolyte 1505 is positioned between the first 101 and second 102 composite electrodes 100 to from ultracapacitor 1500.

In one embodiment, the ultracapacitor 1500 has a capacitance of at least about 2,000 F. In another embodiment, the ultracapacitor 1500 has one or more composite electrodes 100. In yet another embodiment, the ultracapacitor 1500 has one or both of a capacitor volume of less than about 0.5 liter and a capacitor mass of less than about 0.5 Kg. In a preferred embodiment, the ultracapacitor 1500 has a capacitance from about 350 to about 650 F.

Alternate embodiments of the ultracapacitor 1500 optionally includes one or more of a) an ionic liquid capacitor electrolyte 1501; b) an ionic liquid gel polymer electrolyte 1505; and c) a microporous polymer membrane separator positioned between the first and second electrodes is disclosed in U.S. Published Patent Application No. 2008/0192407 hereby incorporated by this reference. The ionic liquid (and/or ionic liquid gel polymer) capacitor electrolyte 1505 can impregnate the composite electrode material 102. The impregnated composite electrode material 102 has one or more of a cell voltage greater than 3 V, an energy density greater than about 17 Wh/kg, a power density greater than about 7 kW/kg, and a cycle life greater than about 750,000 cycles. The ultracapacitor 1500 can have one or both of a power density of at least about 10 kW/kg and an energy density of at least about 10 Wh/kg.

It can be appreciated that, the ultracapacitor 1500 can be arranged in modules. While not be limited by example, ultracapacitors 1500 can be arranged in series, parallel, or a combination thereof to form one or more modules. The module provides one or more of peak power pulses, emergency backup power, system stability, and/or lower demand peaks to reduce transmission and distribution congestion. It can be further appreciated that for the same voltage, the ultracapcitor modules contain substantially fewer capacitors per volt than capacitors of the prior art. In one configuration, a 20 V module would require only about five ultracapacitors instead of about eight capacitors of the prior art. In another configuration, the module can form an uninterrupted power supply (UPS). The UPS power level can range from about 100 to about 50,000 watts, depending on the level of service required. In one configuration, the ultracapacitor modules can have a voltage range from about 20 to about 100 Volts. In one configuration, an UPS in the megawatt range can provide at least about 100 kWs of power for at least about 15 minutes. For offline UPS the power level can range from about 100 to about 5,000 watts (for example for offline service); from about 500 to about 50,000 watts (for example for line-interactive service); and from about 1 megawatt to about 1,000 megawatts (for example for online/double conversion service). The ultracapacitor uninterrupted power system can replace lead-acid batteries for emergency operation during power outages for the applications of utility monitoring systems, communication systems, reclosers, and automatic switching devices. In one configuration, the module and power conversion equipment can supply at least about 3 MJoules of power. In one configuration, the composite electrode 100 is sprially wound.

EXPERIMENTAL

Preparation of a Conventional Activated Carbon Electrodes

Example A

Conventional activated carbon electrodes were prepared from a slurry comprising an activated carbon (specific surface area: of about 2000 m$^2$/g) and a carbon black from Acheson Industries in a polymer binder of poly(vinylidene fluoride-co-hexafluoropropylene) (PVdF-HFP) from Sigma-Aldrich. The polymer binder was dissolved in a solvent blend (75 parts 1-methyl-2-pryyolidone, 25 parts acetone) to form a polymer solution. The slurry was formed by adding certain amounts of the activated carbon and carbon black to the polymer solution. The slurry was pulled down and casted by a coating knife blade on a current collector (aluminum foil) to form a coated current collector. The coated current collector was heated at 80° C. for 1 hour, followed by a 1 hour annealing at 260° C. The annealed coated electrode had a uniform carbon coating.

Characterization of the Conventional Activated Carbon Electrodes

Example B

The conventional electrode of Example A has an annealed carbon coating thickness ranging from about 100 to about 200 μm and a density ranging from about 6 to about 7 mg/cm$^2$.

Figure 1:
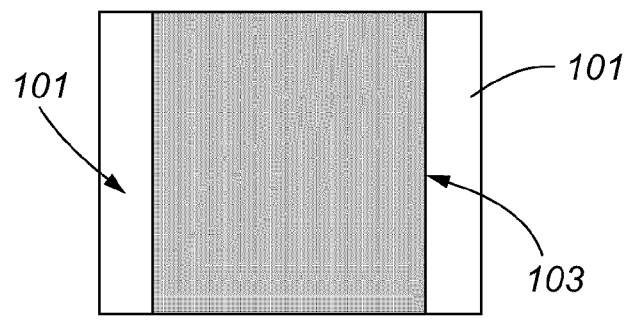
FIG. 1 is an activated carbon/carbon black electrode of the prior art.
Figure 2:
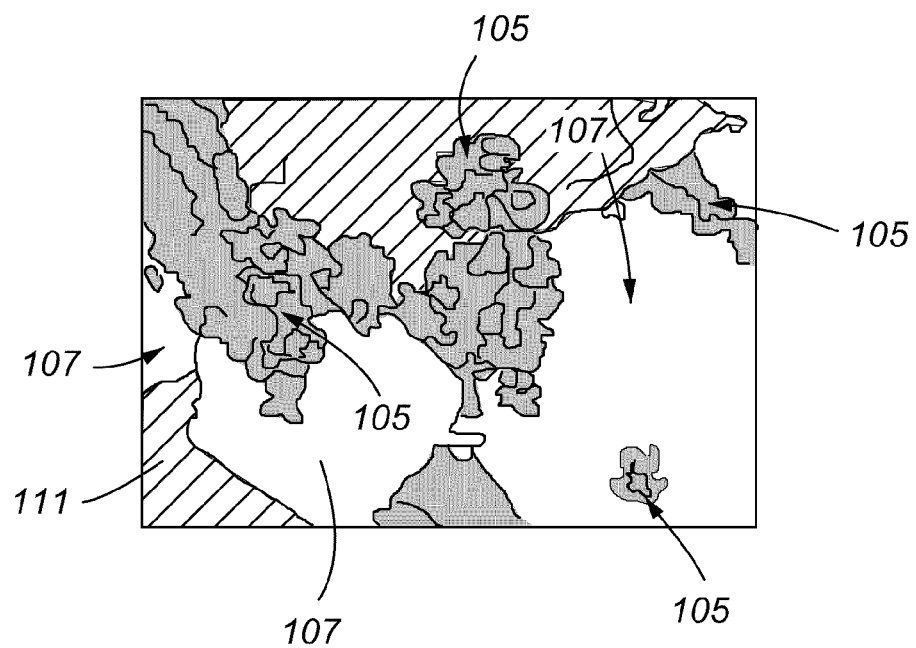
FIG. 2 is a depiction of a scanning electron microscope image of an activated carbon/carbon black electrode of the prior art.
Figure 3:
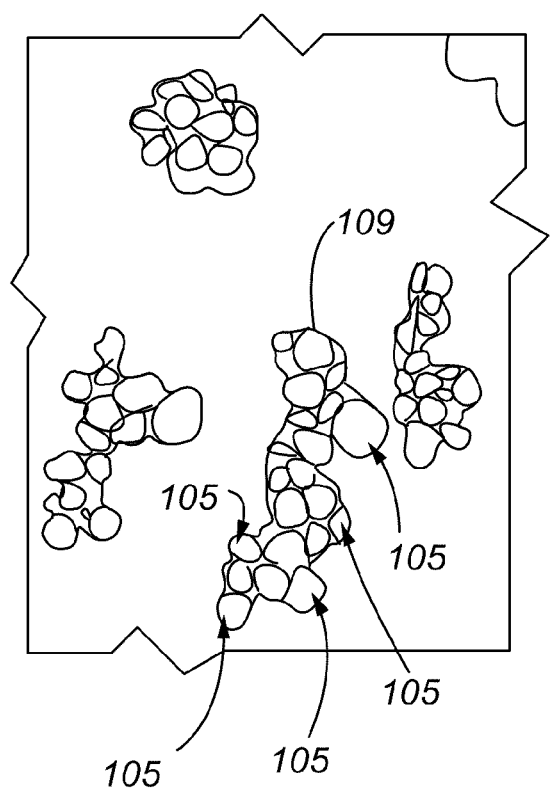
FIG. 3 is a depiction of a carbon black aggregate.
Figure 11:
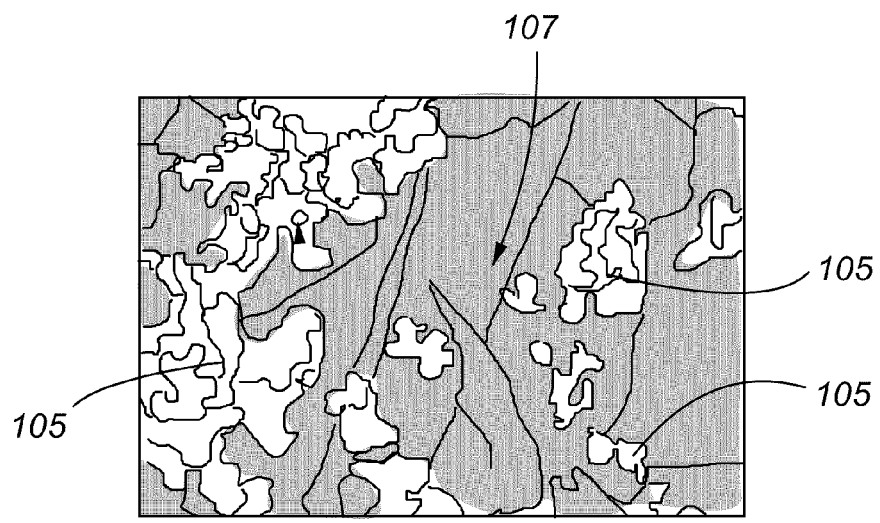
FIG. 11 is a depiction of a scanning electron microscope image of an electrode prepared by the process of Example A.
Figure 12:
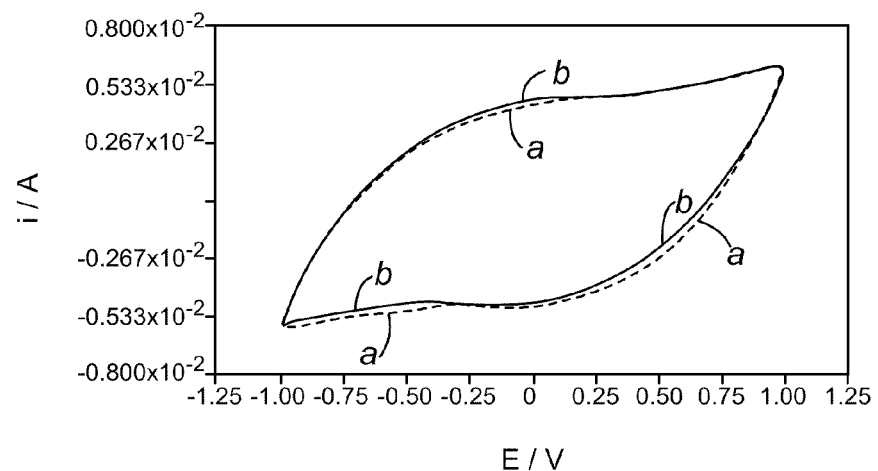
FIG. 12 is a family of cyclic voltamograms obtained in 1 M $Et_4NBF_4$/propylene carbonate for an electrode (activated carbon 61.5 wt %, carbon black 20.5 wt %, polymer binder 18.0 wt %) prepared by the process of Example A (a) and an activated carbon electrode commercially available from WL Gore & Associates, Inc. (b), the cyclic voltamograms were collected at a scan rate of 20 mV/sec with a silver wire reference electrode and a platinum wire counter electrode.

The affect of the activated carbon: carbon black: polymer binder ratio on the electrode physical properties (such as, surface area, conductivity, coating formation and coating adhesion to the current collector) were determined. The electrode physical properties were determined for a activated carbon: carbon black: polymer binder ratio of 61.5/20.5/18.0 (wt. %). The morphology of the coating prepared by the process of Example A (FIG. 11) and a commercial activated carbon/carbon black available from WL Gore and Associates, Inc. (FIG. 2) are similar. FIG. 12 depicts the similar electrochemical properties of the two electrodes in a conventional organic electrolyte. The electrode has a capacitance of about 60 F/g. The physical characteristics of the conventional activated carbon electrode are similar to those of commercially available activated carbon electrodes (having a similar thickness and loading of the active material).

Preparation of Carbon Nanotube Papers

Example C

Carbon nanotube papers were prepared by vacuum filtering a carbon nanotube suspension through a polytetrafluoroethylene filter paper. The carbon nanotube paper was washed (by filtering) first with methanol followed by de-ionized water (to remove any residual sodium hydroxide and/or surfactant). After the washing process, the carbon nanotube paper was dried and characterized.

Characterization of Carbon Nanotube Paper

Example D

Carbon nanotube papers (prepared according to Example C) were prepared using a variety of commercially available carbon nanotubes products. Tube diameter, tube length, electrical conductivity, specific surface area, and catalyst content varied between the various carbon nanotubes products evaluated. The best performing carbon nanotube paper contained a mixture of single and multi walled carbon nanotubes from Nanocomp Technologies Inc. The carbon nanotube paper having the single/multi walled carbon nanotube mixture had substantially long nanotubes having nanotube lengths ranging from about 10 to about 100 µm on average. The nanotube mixture had a high electrical conductivity up to about 1000 S/cm and a low ESR.

Figure 13A:
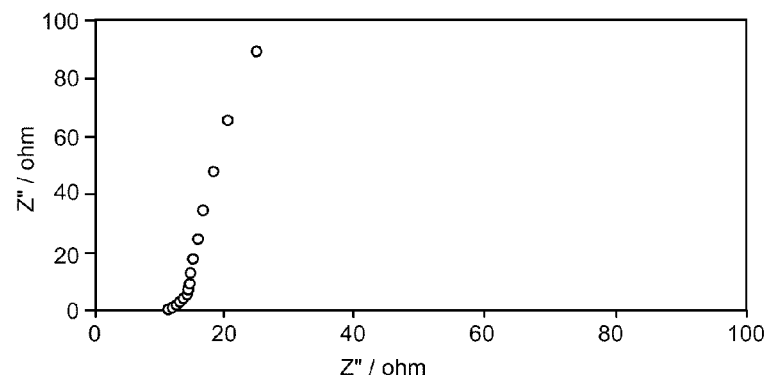
FIG. 13A shows an alternating current impedance spectrum obtained at 5 mV over a frequency range of 100 KHz to 1 mHz in [EMIM][Tf2N] electrolyte for a mixed single/multi walled carbon nanotube paper electrode (Example D)
Figure 13B:
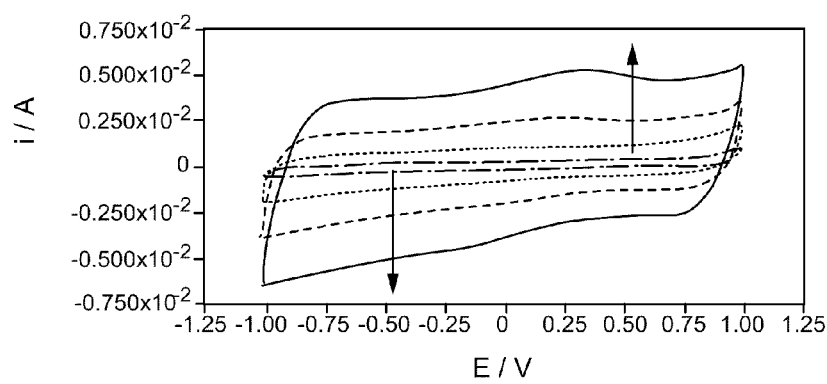
FIG. 13B shows a family of cyclic voltamograms for a mixed single/multi walled carbon nanotube paper electrode (Example D) obtained at increasing scan rates from 5, 20, 50, and 100 mV/sec (per arrows) in [EMIM][Tf2N] electrolyte with a silver wire reference electrode and a platinum wire counter electrode.

Characterization of the carbon nanotube paper electrode 112 (see Table 3) was in an ionic liquid. The preferred ionic liquids for characterization were [EMIM][BF$_4$] and [EMIM][Tf$_2$N]. FIG. 13A is an alternating current (AC) impedance spectrum (also, typically referred to as a Nyquist plot) obtained in [EMIM][Tf$_2$N] for a mixed single and multi-walled carbon nanotube paper electrode. The Nyquist plot impedance spectrum has a vertical line at low frequencies. The low frequency vertical line is indicative of capacitive behavior. FIG. 13B is cyclic voltamogram of the mixed carbon nanotube paper electrode. The cyclic voltamogram exhibits a well-defined rectangularly-shaped voltamogram indicative of capacitor. The capacitance of the mixed carbon nanotube paper electrode was about 20 F/g (in [EMIM][Tf$_2$N]). While not wanting to be bound by theory, the low capacitance of the mixed carbon nanotube paper electrode is believed to be due to its relatively low specific surface area of about 82 m$^2$/g. Furthermore, the increased current of the CNT electrode with increased scan rate indicates increased charge/discharge kinetics in the ionic liquid electrolyte. Oxidation/reduction peaks 212 were apparent in some of the voltamograms. While not wanting to be bound by theory, the oxidation/reduction peaks could be due to residual catalyst present in most commercial carbon nanotube products. The residual catalyst is electroactive and can display reversible oxidation/reduction electrochemistry. The frequency range for the AC impedance spectrum was from about 100 KHz to about 1 mHz, with an AC voltage amplitude of about 5 mV. The cyclic voltamograms were obtained by increasing the scan rates from about 5, 20, 50, to 100 mV/sec (as indicated by the arrows 213). The reference and counter electrodes for the AC impedance spectrum and cyclic voltamograms were, repectively, silver and platinum wire electrodes.

Preparation of Two-Component Carbon Nanotube Composite Electrodes

Example E

Two-component carbon nanotube composite electrodes were prepared by gradually replacing the carbon black, in the above conventional activated carbon electrode preparative procedure (Example A), with carbon nanotubes, while the amounts of activated carbon and polymer binder were held constant. The two-component carbon nanotube composite electrodes were prepared from a slurry comprising activated carbon (specific surface area of about 2000 m$^2$/g), an optional carbon black from Acheson Industries, and the mixed single/multi walled carbon nanotubes (Example D) and a polymer binder of PVdF-HFP. The PVdF-HFP binder was dissolved in a solvent blend of 75 parts 1-methyl-2-pryyolidone and 25 parts acetone. The slurry was formed by adding the activated carbon, optional carbon black and carbon nanotubes to the polymer solution, followed by mixing well. The slurry was pulled down and casted by a coating knife blade on a current collector (aluminum foil) to form a two-component on the coating current collector. The coated current collector was heated at 80° C. for 1 hour, followed by a 1 hour annealing at 260° C. The annealed coating electrode formed a uniform two-component composite coating.

Characterization of the Two-Component Carbon Nanotube Composite Electrodes

Example F

FIGS. 14A-14C depict scanning electron microscope images of three different electrode materials (Example E). FIG. 14A depicts an activated carbon electrode 114 of the prior art comprising activated carbon (about 61.5 wt %), carbon black (about 20.5 wt %) and polymer binder (about 18.0 wt %). FIG. 14B depicts the two-component carbon nanotube composite electrode 116 comprising activated carbon (about 61.5 wt %), carbon nanotubes (about 10.25 wt %), carbon black (about 10.25 wt %) and polymer binder (about 18.0 wt %). Another carbon nanotube composite electrode 118 is depicted in FIG. 14C, the another composite electrode comprises activated carbon (61.5 wt %), carbon nanotubes (20.5 wt %) and polymer binder (18.0 wt %) is depicted in FIG. 14C. Increasing the amount of carbon nanotubes in the composition decreases the resistance of the composites (Table 3). The decreased resistance for the carbon nanotube compositions is due to the higher electric conductivity of the carbon nanotubes compared to the carbon black. The greater the carbon nanotube weight percent, the lower the resistance for the carbon nanotube composites (Table 3). The activated carbon electrode 114 (FIG. 14A) has aggregated carbon black particles. The carbon nanotube composite electrodes 116 and 118 have carbon nanotubes substantially uniformly distributed throughout the electrode. The carbon nanotubes and/or their substantial uniform distribution within the composite provides for greater pore volume and mesoporosity and improved electrolyte accessibility compared to electrodes of the prior art based (that is, activated carbon/carbon black electrodes). Furthermore, the carbon nanotube composite electrodes 116 and 118 have greater electrochemical and capacitive behavior in an ionic liquid electrolyte (see Table 3).

Figure 15:
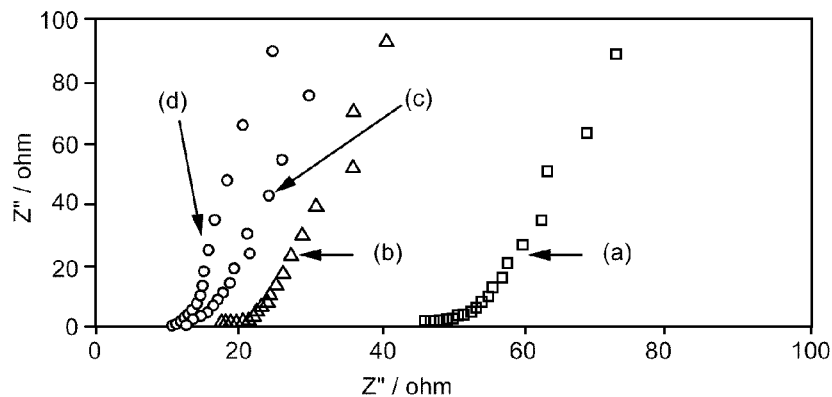
FIG. 15 shows a family of alternative impedance spectra obtained at a voltage amplitude of 5 mV over a frequency range of 100 KHz to 1 mHz in [EMIM][Tf$_2$N] for different electrode materials, (a) an electrode comprising 61.5 wt % activated carbon, 20.5 wt % carbon black and 18.0 wt % polymer binder, (b) a composite electrode comprising 61.5 wt % activated carbon, 20.5 wt % mixed single/multi walled carbon nanotubes and 18.0 wt % polymer binder, (c) another composite electrode comprising 64.0 wt % activated carbon, 20.3 wt % mixed single/multi walled carbon nanotubes, 8.0 wt % polymer binder and 7.7 wt % ionic liquid, and (d) mixed single/multi walled carbon nanotubes paper electrode.
Figure 16:
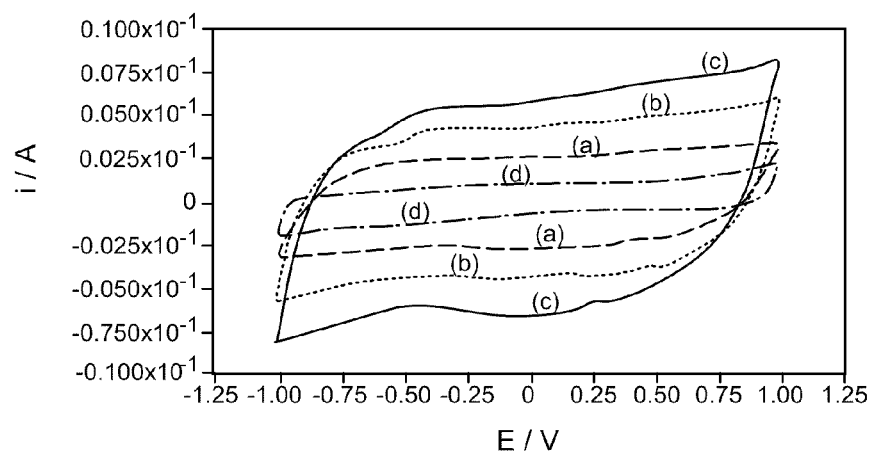
FIG. 16 shows a family of cyclic voltamograms obtained in [EMIM][Tf$_2$N] at a scan rate of 20 mV/second for different electrode materials, (a) an electrode comprising 61.5 wt % activated carbon, 20.5 wt % carbon black and 18.0 wt % polymer binder, (b) a first composite electrode comprising 61.5 wt % activated carbon, 20.5 wt % mixed single/multi walled carbon nanotubes and 18.0 wt % polymer binder, (c) a second composite electrode comprising 64.0 wt % activated carbon, 20.3 wt % mixed single/multi walled carbon nanotubes, 8.0 wt % polymer binder and 7.7 wt % ionic liquid, and (d) mixed single/multi walled carbon nanotubes paper electrode, the reference electrode was a silver wire and the counter electrode was a platinum wire.
Figure 17A:
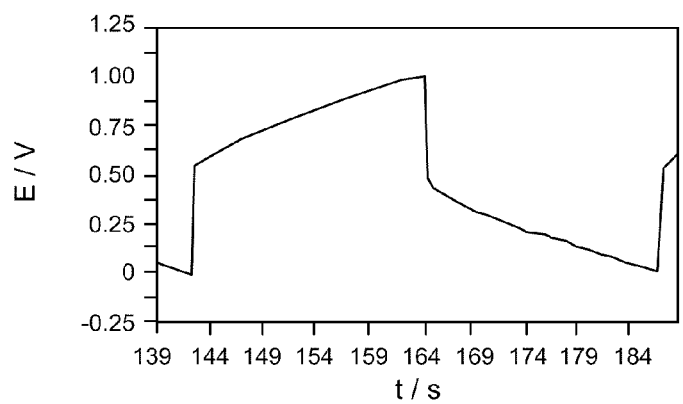
FIGS. 17A-D are galvanostatic charge/discharge curves obtained in [EMIM][Tf$_2$N] at a current density of 10 mA/cm$^2$ for different electrode materials, (a) an electrode comprising 61.5 wt % activated carbon, 20.5 wt % carbon black and 18.0 wt % polymer binder, (b) a first composite electrode comprising 61.5 wt % activated carbon, 20.5 wt % mixed single/multi walled carbon nanotubes and 18.0 wt % polymer binder, (c) a second composite electrode comprising 64.0 wt % activated carbon, 20.3 wt % mixed single/multi walled carbon nanotubes, 8.0 wt % polymer binder and 7.7 wt % ionic liquid, and (d) mixed single/multi walled carbon nanotubes paper electrode.
Figure 17B:
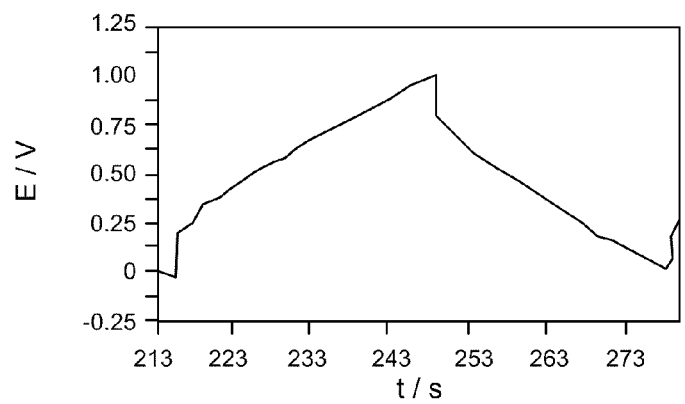
Figure 17C:
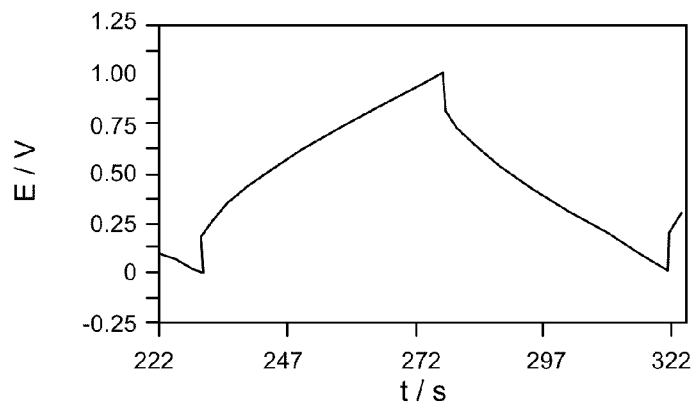
Figure 17D:
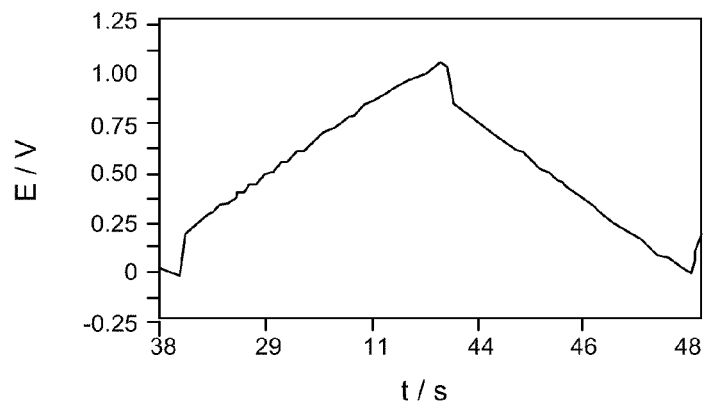
Figure 26:
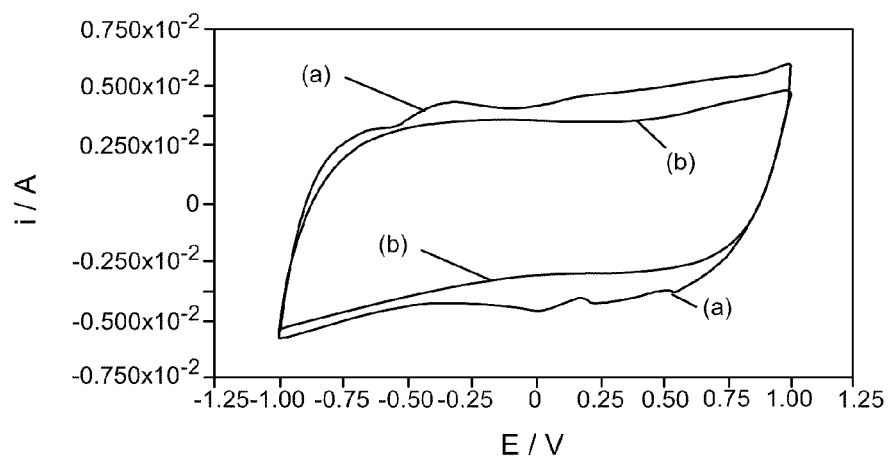
FIG. 26 is a family of cyclic voltamograms of an activated carbon (61.5 wt %), carbon nanotube (20.5 wt %) and polymer binder (18.0 wt %) composite electrode obtained in [EMIM][f$_2$N] (cyclic voltamogram (a)) and [EMIM][BF$_4$] (cyclic voltamogram (b)), both obtained at scan rates of 20 mV/sec with silver and platinum wire reference electrodes.

The decreased resistance of the carbon nanotube composite electrodes 116 and 118 also results in decreases in the equivalent distributed (EDR) and series (ESR) resistances (see Table 3). The EDR is a measure of ion transport at the electrode/electrolyte interface, while the ESR is a measure of the resistance of the electrode itself (that is, the resistance of electrolyte within the porous layer of the electrode and the resistance between the electrode and current collector). FIG. 15 depicts the AC impedance spectra of electrodes 112, 114, 116 and 118. The carbon nanotube electrodes 112, 116 and 118 have lower EDRs (222, 224, 226 compared to 228), 45° Warburg regions at high frequencies (232, 234, 236 compared to 238) and steeper slopes at low frequencies (242, 244, 246 compared to 248), all indicative of faster ion transport and better capacitive behavior at the electrode/electrolyte interface compared to the electrode 114 of the prior art. FIG. 16 depicts a family of cyclic voltamograms for electrodes 112, 114, 116 and 118. The carbon nanotube electrodes 113, 116 and 118 have superior capacitive behavior. More specifically, the carbon nanotube composite electrodes 116 and 118 have higher currents (compare cyclic voltamograms 116 and 118 to 112 and 114), higher capacitances, and sharper transient responses at both ends of the cyclic voltamograms. Furthermore, the carbon nanotube composite electrodes 116 and 118 have smaller internal resistance drops (see FIGS. 17A-17D). The small internal resistance drop for composite electrodes 116 and 118 support faster ion transport and faster charge/discharge processes.

behavior of electrode 118 was determined by cyclic voltametry in the two ionic liquid electrolytes [EMIM][Tf$_2$N] (FIG. 26, curve a) and [EMIM][BF$_4$] (see FIG. 26, curve b). The electrode 118 capacitance was greater in [EMIM][Tf$_2$N] (about 142 F/g) than [EMIM][BF$_4$] (about 114 F/g). While not being bound by theory, the lower viscosity of [EMIM][Tf$_2$N] (see Table 2) can affect capacitive performance. The cyclic voltammetry scan rate was about 20 mV/second and the reference and counter electrodes were, respectively, silver and platinum wire electrodes.

TABLE 3

Physical and performance properties of different electrode materials

| Property | Electrode | | | | |
|---|---|---|---|---|---|
| | CNT Paper[a] | Conventional AC | AC/CNT Composite | AC/CNT composite | AC/CNT/IL composite |
| Composite | 112 | 114 | 116 | 118 | 120 |
| Composition (wt %) | CNT: 100 | AC/CB/PB: 61.5/20.5/18.0 | AC/CNT/CB/PB: 61.5/10.25/10.25/18.0 | AC/CNT/PB: 61.5/20.5/18.0 | AC/CNT/PB/IL: 64.0/20.3/8/7.7 |
| Surface resistance ($\Omega$/cm)[b] | 1.2 | 11.1 | 7.9 | 2.7 | 2.1 |
| Specific surface area (m$^2$/g)[c] | 82 | 1486 | 1434 | 1326 | 1380 |
| ESR[d] | 10.7 | 46.2 | 33.3 | 17.6 | 10.0 |
| EDR[d] | 3.8 | 6.9 | 6.5 | 4.2 | 4.0 |
| Slope of low-frequency-line[d] | 7.8 | 3.7 | 4.1 | 4.8 | 5.0 |
| Capacitance (F/g)[d] | 20 | 62 | 105 | 142 | 188 |

[a]Made from the Nanocomp's SWNT-MWNT product.
[b]Measured by a 2-probe approach using a multimeter.
[c]Measured by the standard BET method.
[d]Measured in [EMIM][Tf$_2$N].

The pure carbon nanotube paper electrode 112 was further compared to the conventional activated carbon electrode 114 in the ionic liquid electrolyte [EMIM][Tf$_2$N]. The carbon nanotube paper electrode 112 has excellent mesoporosity, electrolyte accessibility, low equivalent series resistance, low equivalent distributed resistance, small 45° Warburg region, and high slope of the low-frequency-line (see FIGS. 15 and 16). However, carbon nanotube electrode 112 has small cyclic voltamogram current and capacitance in the ionic liquid electrolyte (FIG. 16, compare cure (d) to curves (a)-(c)). While not wanting to be bound by theory, the low specific surface area of the carbon nanotube paper electrode 112 (see Table 3) could explain the small cyclic voltamogram current and capacitance. However, even with relatively slow charge/discharge kinetics, the composite electrode 116 has a high capacitance (FIG. 16, compare curve (b) to curve (d)). The high-surface-area activated carbon in the composite electrode 116 results in a higher surface area (see, Table 3).

While not being bound by example, increasing the activated carbon content (greater than about 61.5 wt %) decreased the conductivity and lowering the polymer binder content (less than about 18.0 wt %) formed poor composite films.

Affect of Electrolyte on Composite Electrode Performance

Example G

The electrolyte can affect electrochemical and capacitive behavior of the electrode. The electrochemical and capacitive Preparation of Three-Component Carbon Nano-Tube Composite Electrodes Example H A three-component carbon nano-tube electrode 120 comprises activated carbon, carbon nanotubes, polymer binder and ionic liquid. The ionic liquid is added during slurry preparation. More specifically, the three-component carbon nanotube composite electrodes were prepared by gradually replacing some of the polymer binder with ionic liquid in the above two-component composition electrode preparative procedure (Example E). The three-component carbon nanotube composite electrodes were prepared from a slurry comprising an activated carbon (specific surface area of about 2000 m$^2$/g), carbon nanotubes, ionic liquid and a polymer binder of PVdF-HFP. The PVdF-HFP binder was dissolved in a solvent blend of 75 parts 1-methyl-2-pryyolidone and 25 parts acetone. The slurry was formed by adding the activated carbon, ionic liquid and carbon nanotubes to the polymer solution. The slurry was pulled down and casted by a coating knife blade on a current collector (aluminum foil) to form the three-component coated current collector. The three-component coated current collector was heated at 80° C. for 1 hour, followed by a 1 hour annealing at 260° C. The annealed coated electrode formed a uniform three-component composite coating. The thermally stable [EMIM][Tf$_2$N] ionic liquid does not substantially evaporate during the heating and annealing processes. That is, most, if not all, of the thermally stable [EMIM][Tf$_2$N] ionic liquid remains within the three-component composite coating. Furthermore, the [EMIM][Tf$_2$N] ionic liquid can act as a unique plasticizer. The ionic liquid plasticizer decreases the amount of polymer binder necessary to form a mechanically strong film. The ionic liquid can also lower the resistance of the resulting electrode composite (see Table 3). Furthermore, the ionic liquid can gel and/or stablize the three-component composite electrode.

Characterization of the Three-Component Nanotube Composite Electrodes

Example I

Figure 18:
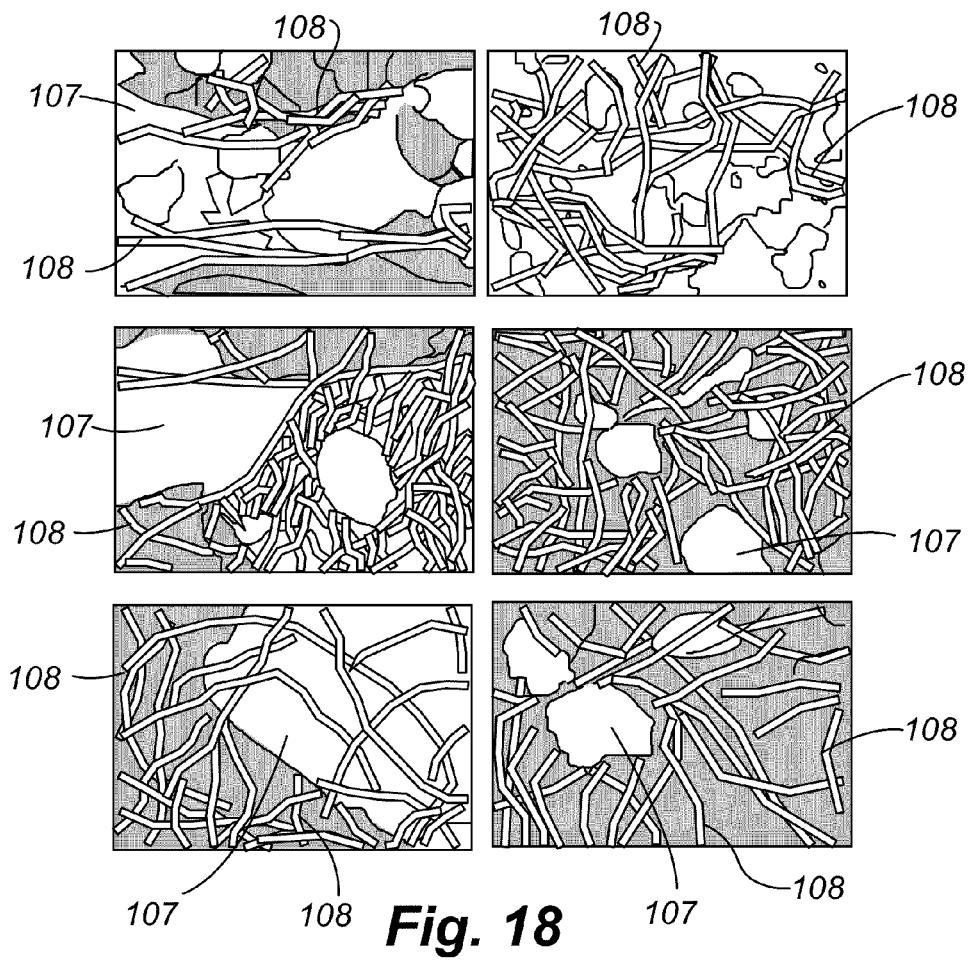
FIG. 18 are depictions of scanning electron microscope images of an electrode comprising 61.5 wt % activated carbon 20.5 wt % mixed single/multi walled carbon nanotubes and 18.0 wt % polymer binder (left side) and an electrode comprising 64.0 wt % activated carbon 20.3 wt % mixed single/multi walled carbon nanotubes and 8.0 wt % polymer binder and 7.7 wt % ionic liquid (right side)
Figure 19:
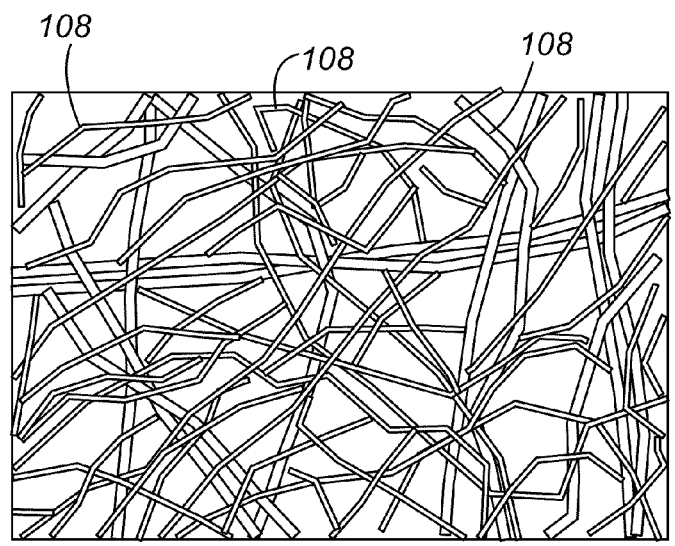
FIG. 19 is a depiction of a scanning electron microscope image of mixed single/multi walled carbon nanotubes from Nanocomp Technologies, Inc.

FIG. 18 depicts various scanning electron microscope images of two- (118) and three-component (120) nanotube composite electrodes (Examples E and H). The series of images on the left-hand side of FIG. 18 are of the two-component composite electrode 118, while the images on the right-side are of the three-component composite electrode 120. The compositional differences between the left- and right-hand series of images are the amounts of: a) activated carbon (61.5 wt % versus 64.0 wt %), b) ionic liquid (0 wt % versus 7.7 wt %) and c) polymer binder (18.0 wt % versus 8.0 wt %). While not wanting to be bound by theory, the ionic liquid substantially distributes the nanotubes in a more uniform, less entangled manner (compare right- to left-hand side images). The three-component nanotube composite 120 is more conductive and more electrolyte-accessible composite than the two-component composite 118, see Table 3. Furthermore, the three-component composite 120 has a lower ESR (10.0 versus 17.6), a lower EDR (4.0 versus 4.0), a smaller 45° Warburg region (122 versus 124), and a higher slope of the low-frequency-line (128 versus 130) than the two-component composite 118. In other words, the ionic liquid facilitates ion transport at the electrode/electrolyte interface. Higher surface area electrodes having a larger content of activated carbon can be prepared with the introduction of the ionic liquid. While not being bound by theory, the ionic liquid forms a stable, uniform nanocomposite gel, where the entangled nanotube bundles (see FIG. 19, nanotubes as supplied) are at least partially untangle (see FIG. 18, nanotubes in ionic liquid composite electrode).

Figure 20:
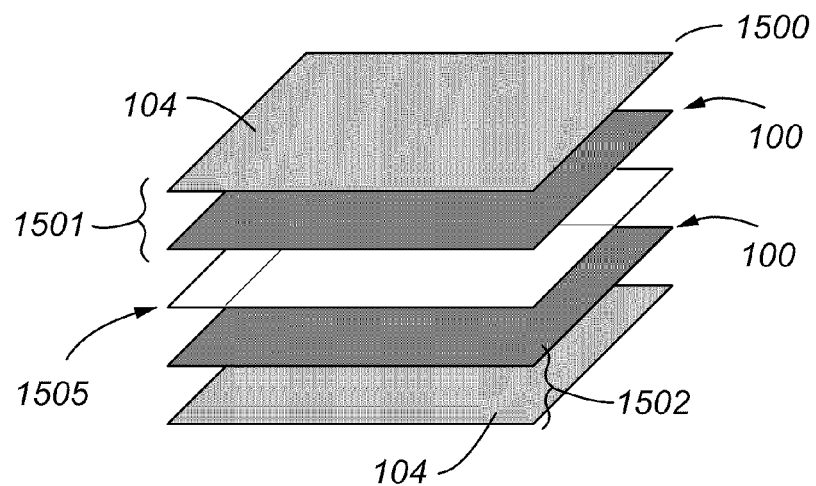
FIG. 20 is an exploded elevation view of an ultracapacitor according to an embodiment of the present invention.

Preparation of an Electrochemical Energy Device (an Ultracapacitor) having Three-Component Nanotube Composite Electrodes Example J FIG. 20 depicts, an electrochemical capacitor 150 having three-component nanotube composite electrodes comprising activated carbon/carbon nanotube/ionic liquid composite electrodes. The electrochemical capacitor 150 comprises a PTFE membrane positioned between the two activated carbon/carbon nanotube/ionic liquid composite electrodes. The PTFE membrane is impregnated with an [EMIM][Tf$_2$N] ionic liquid, the [EMIM][Tf$_2$N] ionic liquid is in contact with the two three-component nanotube composite electrodes.

Figure 21:
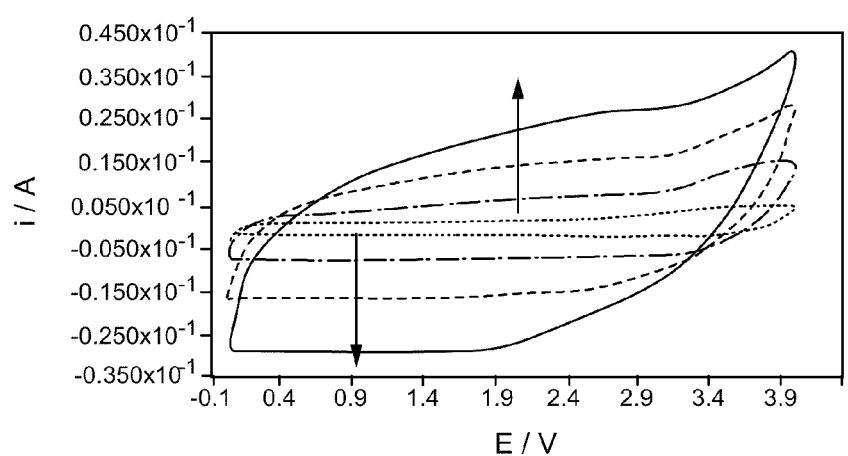
FIG. 21 shows a family of cyclic voltamograms for an ultracapacitor according to an embodiment of the present invention (Example J) obtained at increasing scan rates of 5, 20, 50, and 100 mV/sec (per arrows)

Electrochemical Characterization of the Electrochemical Device having Three-Component Nanotube Composite Electrodes Example K FIG. 21 depicts a family of cyclic voltammograms of the ultracapacitor 150 (Example J). The cyclic voltammograms were collected at increasing scan rates ranging from 5, 20, 50 to 100 millivolts per second (as indicated by arrows 154). The arrows 154 indicate current increases with increases in scan rate, the applied voltage ranges from about 0 to about 2.5 volts. Furthermore, the cyclic voltamograms remain substantially rectangular with increases in the charge/discharge rate. The substantial retention of the cyclic voltamogram rectangular shape with increases in the charge/discharge rate is indicative of excellent charge storage and/or delivery capabilities.

Figure 24A:
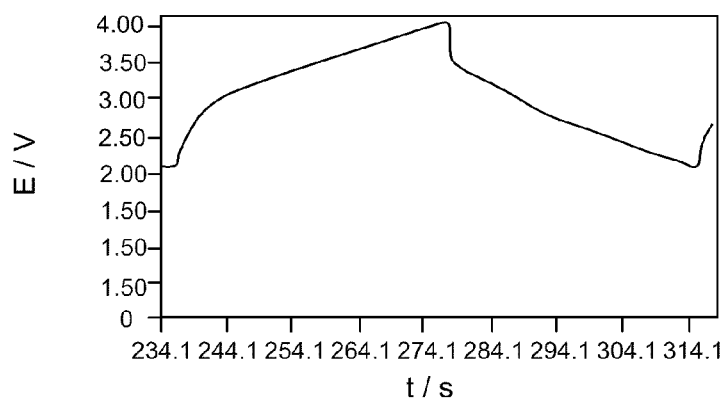
FIG. 24 shows a family of galvanostatic charge/discharge curves obtained at a current density of 10 mA/cm$^2$ with cut-off voltages of 2.4/4.0 volts for a composite electrode ultracapacitor (a) fabricated according to Example J and an ionic liquid activated carbon capacitor (b) fabricated according to Example J.

FIG. 24 depicts galvanostatic a charge/discharge curve of ultracapacitor 150, curve (a). The galvanostatic charge/discharge curve is indicative of a capacitor having a small internal resistance and a substantially linear galvanostatic charge and/or discharge. The galvanostatic charege/discharge curve was obtained at a current density of about 10 mA/cm$^2$ with a cut-off voltage of 2.0/4.0 volts.

Figure 22:
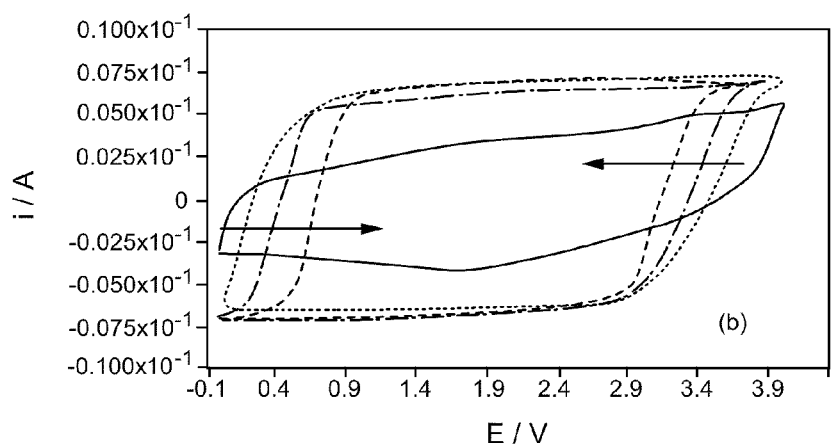
FIG. 22 shows a family of cyclic voltamograms for an activated carbon electrode ultracapacitor fabricated according to Example J obtained at increasing scan rates of 5, 20, 50, and 100 mV/sec (per arrows)

Electrochemical Comparison of an Activated Carbon Ionic Liquid Capacitor with a Three-Component Carbon Nanotube Composite Capacitor Example L FIG. 22 depicts a family of cyclic voltamograms for a capacitor having activated carbon electrodes, while FIG. 21 depicts a family of cyclic voltamograms for the capacitor (Example J) having three-component composite electrodes, both capacitors have ionic liquids. Both capacitors have electrochemical windows of about 4 volts.

For the activated carbon electrode capacitor, the capacitor charging and discharging current increases when the scan rate increases from about 5 to about 20 mV/s (FIG. 22). However, scan rates above 20 mV/sec do not further increase the capacitor charging and/or discharging current. That is, for scan rates about 20 mV/sec the capacitor charging/discharging currents remain substantially unchanged. Furthermore, the cyclic voltamogram substantially decreased in size (depicted by arrows 158) for scan rates about 20 mV/sec, indicative of poor charge storage and/or delivery capabilities. That is, the capacitor having activated carbon electrodes and an ionic liquid electrolyte has substantially slow charge and/or discharge processes. While not being bound by theory, the substantially slow charge and/or discharge processes are due to low electrolyte accessibility and high viscosity ionic electrolyte compared to convention aqueous and organic electrolytes (see, Table 1).

The charging and/or discharging current for the three-component composite electrode capacitor increases with increases in the scan rate, indicated by arrows 160 (FIG. 21). Furthermore, the cyclic voltamogram remains substantially rectangular during high scan rate charging and discharging. In other words, the three-component composite electrode has substantial charge storage and delivery capabilities. That is, the three-component composite electrode substantially supports fast charge and/or discharge electrode processes.

Furthermore, when cycled to 4 V, the three-component composite electrode capacitor exhibited additional oxidative/reductive processes. While not being bound by theory, the additional oxidative/reductive process could be due to a residual catalyst in the carbon nanotube (as noted for the carbon nanotube paper). The additional oxidative/reductive processes are fast and reversible, indicative of a pseudocapacitance. The pseudocapacitance further increases the charge storage capacity to the capacitor. The increased capacitance is shown in current magnitude between the two capacitors in FIGS. 22 and 21. However, the pseudocapacitance has slower charge and/or discharge kinetics, as indicated by cyclic voltamogram transient responses (see right and left ends of cyclic voltamograms). The transient responses can limit the power density of the capacitor.

Figure 23A:
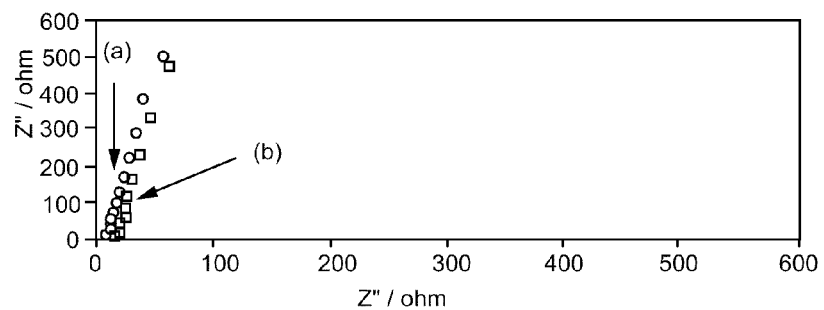
FIG. 23 shows a family of open-circuit alternating current impedance spectra obtained at a voltage amplitude of 5 mV over a frequency range of 100 KHz to 1 mHz for a composite electrode ultracapacitor (a) fabricated according to Example J and an ionic liquid activated carbon capacitor (b) fabricated according to Example J.
Figure 23B:
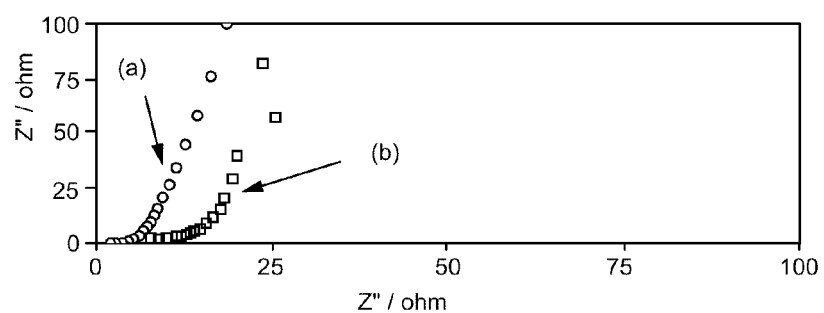
Figure 24B:
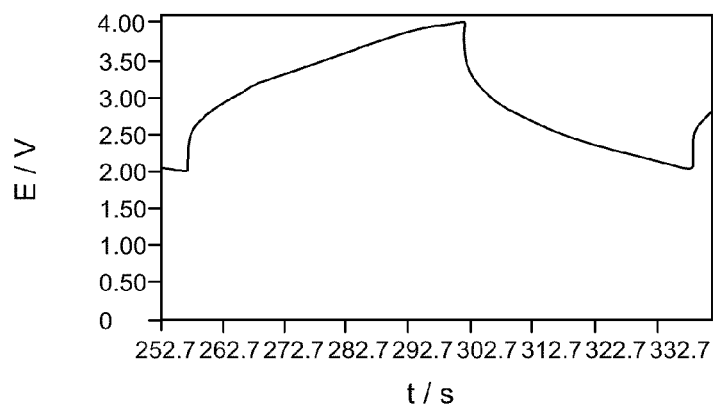

FIG. 23 depicts alternating current (AC) impedance spectra for capacitors having activated carbon electrodes (curves denoted by (b)) and three-component composite electrodes (curves denoted by (a). The capacitive behavior parameters of the capacitors were calculated from the AC impedance spectra, the capacitive properties are summarized as in Table 4. At low frequencies the AC impedance spectra for both capacitors have vertical lines.

discharge, as exhibited by a substantially straight-line discharge curve. In other words, the electrochemical-stored energy is delivered rapidly. The charging process from about 2 to about 4 V for the activated carbon electrode capacitor FIG. 24(b) is relatively slow compared to the charging process of FIG. 24(a).

Figure 25:
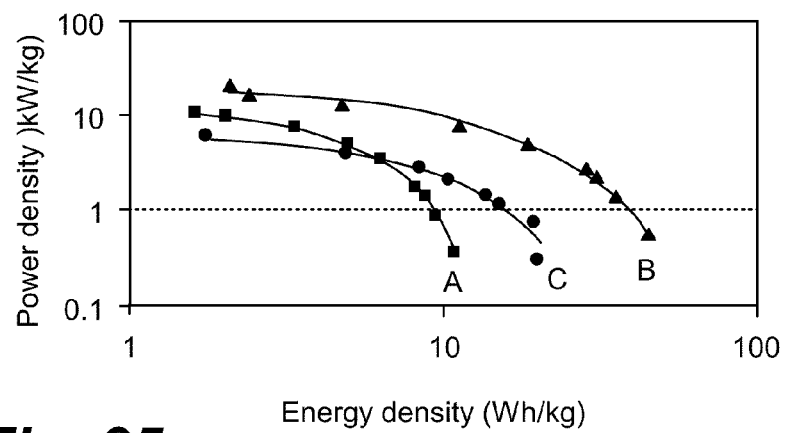
FIG. 25 is a family of Ragone plots obtained at a current densities from about 2 to about 50 mA/cm$^2$ for (A) a composite electrode ultracapacitor fabricated according to Example J with a cut-off voltage of 1.25/2.5V, (B) a composite electrode ultracapacitor fabricated according to Example J with a cut-off voltage of 2.0/4.0V, and (C) an ionic liquid activated carbon capacitor fabricated according to Example J with a cut-off voltage of 2.0/4.0V.

FIG. 25 depicts Ragone plots for three-component composite electrodes capacitors at 1.25/2.5 volts (curve A) and 2.0/4.0 volts (curve B) and for the activated carbon/ionic liquid capacitors (curve C). Furthermore, a comparison of

TABLE 4

Capacitive behavior and performance of ultracapacitors.

| Capacitor | ESR (Ω) | EDR (Ω) | Slope of low-frequency line | Knee frequency (Hz) | $E_{max}$ (Wh/kg) | $P_{max}$ (kW/kg) | $E_{max}$ (Wh/kg)$^a$ | $P_{max}$ (kW/kg)$^a$ |
|---|---|---|---|---|---|---|---|---|
| Three-component composite/ ionic liquid | 0.5 | 0.8 | 7.9 | 4.0 | 50 | 22 | 17.5 | 7.7 |
| Activated carbon/ ionic liquid | 0.7 | 0.9 | 7.0 | 0.09 | 19.6 | 6.3 | 6.9 | 2.2 |

$^a$Performance of packaged cells, estimated by multiplying the active-material-based performances by a factor of 0.35

The activated carbon/ionic liquid electrode capacitor has a high ESR, a high EDR and an expanded 45° Warburg region. The AC impedance spectra for the activated carbon electrodes are indicative of a high interfacial resistance and a slow and/or difficult transport of electrolyte ions at the electrode/electrolyte interface of the capacitor. In other words, the shallow (or small) low-frequency slope and small 45° Warburg frequency for the activated carbon capacitor is indicative of poor capacitive behavior.

In contrast to the activated carbon/ionic liquid electrode capacitor, the three-component composite electrode capacitor has excellent capacitive behavior. In other words, the three-component composite electrode capacitor has one or more of a lower ESR, a lower EDR, a larger low-frequency slope, and a higher 45° Warburg frequency than the activated carbon/ionic liquid electrode capacitor (see Table 4). That is, the three-component composite electrode has substantially greater electrolyte accessibility than the activated carbon electrode. Furthermore, the 45° Warburg frequency for the three-component composite electrode (about 4 Hz) is substantially greater than ultracapacitors of the prior art (less than about 1 Hz). In other words, the energy stored in the three-component composite electrode capacitor is accessible at frequencies at least as high as about 4 Hz. In power performance applications, the larger frequency response range for the three-component composite electrode capacitor substantially performs better than the capacitors of the prior art.

FIG. 24 depicts galvanostatic charge/discharge curves over a current density of about 10 nAcm$^2$ for capacitors having three-component composite and activated electrodes. The activated carbon/ionic liquid electrode capacitor has a slow galvanostatic discharge, FIG. 24 (b), as exhibited by a bent, rather than a straight, galvanostatic discharge curve. While not wanting bound by theory, the non-linear discharge curve can be due to a high interfacial resistance and slow and/or difficult ion transport at interface of the activated carbon and ionic liquid. FIG. 24 (a) depicts the galvanostatic discharge for the three-component composite electrode capacitor. The galvanostatic discharge curve depicts a substantially rapid Ragone plots A and B indicate that high voltages can enhance the performance of the three-component composite capacitor. The Ragone plots further indicate that, at all of the evaluated discharge current densities, the three-component composite electrode capacitor has substantially higher energy and power densities than the activated carbon/ionic liquid capacitor (see Table 4).

Preliminary Cycle Life Tests

Example M

The capacitor power density for three-component composite electrode remained substantially stable through a 20 mA/cm$^2$ current density, 2/4 volt cycle life test. During the first 1,000 cycles the capacitor energy density remained substantially stable, the energy density decreasing about 5% or less. The power and energy densities were substantially maintained for at least about 100,000 cycles.

A number of variations and modifications of the invention can be used. It would be possible to provide for some features of the invention without providing others.

In other embodiments, the ultracapacitors of the present invention are used in applications other than hybrid electric vehicles. For example, in consumer electronics, they can be used for notebook computers, cellular telephones, pagers, videocameras, and hand-held tools. In medical electronics, they can be used for portable defibrillators, drug delivery units, and neurological stimulators. In the military and defense, the ultracapacitors can be used in specialized mobile power applications such as communication devices, unmanned aerial vehicles, spacecraft probes, and missile systems. Environmentally friendly composite electrodes and/or ultracapacitors having an ionic liquid can benefit a wide range of other electrochemical devices (such as batteries, electrochromic devices, sensors, photoelectrochemical solar cells, and light emitting electrochemical cells) with high performance and extended lifetimes.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An electrode material for an electrochemical energy storage device, comprising:
   (a) a plurality of activated carbon particles;
   (b) a plurality of carbon nanotubes; and
   (c) a binder comprising a polymeric binder and an ionic liquid, wherein the plurality of activated carbon particles are intermixed and dispersed within an entangled carbon nanotube network comprising the plurality of carbon nanotubes, wherein the plurality of carbon nanotubes and the plurality of activated carbon particles are substantially dispersed in the binder, wherein at least most of the carbon nanotubes are in contact with at least two or more of the activated carbon particles.

2. The electrode material of claim 1, wherein the plurality carbon nanotubes further comprise one of single walled carbon nanotubes, multi-walled carbon nanotubes, and mixtures thereof and wherein the carbon nanotubes have a length ranging from about 10 to about 1,000 μm and wherein the carbon nanotubes have an electrical conductivity of at most about 200 S/cm.

3. The electrode material of claim 1, wherein the polymeric binder is a polymer selected from the group consisting essentially of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof.

4. The electrode material of claim 1, wherein the polymeric binder comprises poly(vinylidene fluoride-co-hexafluoropropylene).

5. The electrode material of claim 1, wherein the ionic liquid comprises oppositely charged ions, wherein the ionic liquid has a melting point of no more than about 100 degrees Celsius, a decomposition temperature of at least about 200 degrees Celsius, a viscosity of no more than about 200 Cp, an ionic conductivity of at least about 0.1 mS/cm, and an electrochemical window of at least about 2 Volts and -wherein the ionic liquid comprises:

(A) at least one cation selected from the group consisting essentially of the following compounds and mixtures thereof:

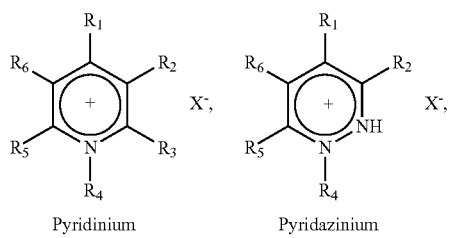

Pyridinium            Pyridazinium

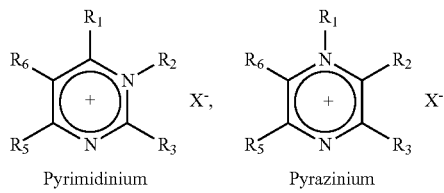

Pyrimidinium          Pyrazinium

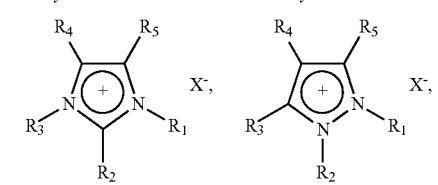

Imidazolium           Pyrazolium

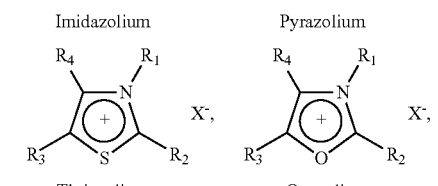

Thriazolium           Oxazolium

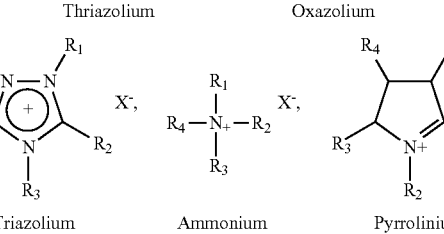

Triazolium    Ammonium    Pyrrolinium

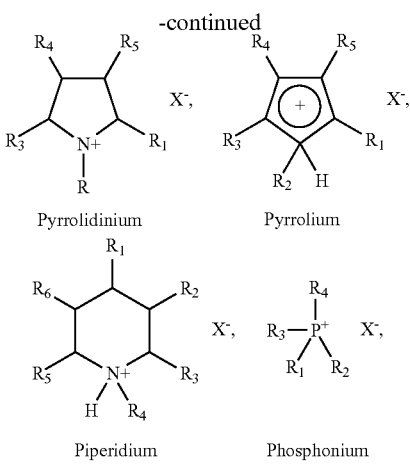

Pyrrolidinium   Pyrrolium

Piperidium   Phosphonium wherein $R_1$, $R_2$, $R_3$, $R_4$, $R_5$, and $R_6$ of the cationic components are identical or different and are selected from the group consisting essentially of:
  (i) a hydrogen;
  (ii) a halogen;
  (iii) a hydroxyl;
  (iv) an amine;
  (v) a thiol;
  (vi) a $C_1$ to $C_{25}$ straight-chain or branched aliphatic hydrocarbon radical;
  (vii) a $C_5$ to $C_{30}$ cycloaliphatic hydrocarbon radical;
  (viii) a $C_6$ to $C_{30}$ aromatic hydrocarbon radical;
  (ix) a $C_7$ to $C_{40}$ alkylaryl radical;
  (x) a $C_2$ to $C_{25}$ linear or branched aliphatic hydrocarbon radical having interruption by one or more heteroatoms, such as, oxygen, nitrogen or sulfur;
  (xi) a $C_2$ to $C_{25}$ linear or branched aliphatic hydrocarbon radical having interruption by one or more functionalities selected from the group consisting essentially of:
    (a') a carbonyl;
    (b') an ester;
    (c') an amide, where R' is selected from the group consisting essentially of hydrogen, $C_1$-$C_{12}$ straight-chain, or branched or cyclic alkane or alkene;
    (d') a sulfonate;
    (e') a sulfonamide, where R' is selected from the group consisting of hydrogen, $C_1$-$C_{12}$ straight-chain, or branched or cyclic alkane or alkene;
  (xii) a $C_2$ to $C_{25}$ linear or branched aliphatic hydrocarbon radical terminally functionalized by Cl, Br, F, I, NH, OH, $NH_2$, $NHCH_3$ or SH;
  (xiii) a $C_5$ to $C_{30}$ cycloaliphatic hydrocarbon radical having at least one heteroatom selected from the group consisting essentially of O, N, S, and optionally substituted with at least one of the following Cl, Br, F, I, NH, OH, $NH_2$, $NHCH_3$ or SH;
  (xiv) a $C_7$ to $C_{40}$ alkylaryl radical having at least one heteroatom selected from the group consisting essentially of O, N, S, and optionally substituted with at least one of the following:
    (a'') a $C_2$ to $C_{25}$ straight-chain or branched hydrocarbon radical substituted with at least one of the following Cl, Br, F, I, NH, OH, $NH_2$, $NHCH_3$ or SH;
    (b'') a $C_5$ to $C_{30}$ cycloaliphatic hydrocarbon radical substituted with at least one of the following Cl, Br, F, I, NH, OH, $NH_2$, $NHCH_3$ or SH
    (c'') a hydroxyl;
    (d'') an amine;
    (e'') a thiol;
  (xv) a polyether of the type —O—(—$R_7$—O—)$_n$—$R_8$ or block or random type —O—(—$R_7$—O—)$_n$—(—$R_{7'}$—O—)$_m$—$R_8$, wherein at least one of the following is true:
    (a''') $R_7$ is a linear or branched hydrocarbon radical having from 2 to 4 carbon atoms;
    (b''') $R_{7'}$ is a linear or branched hydrocarbon radical having from 2 to 4 carbon atoms; and
    (c''') wherein n is from 1 to 40; and
    (d''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and
  (xvi) a polyether of the type —O—(—$R_7$—O—)$_n$—C(O)—$R_8$ or block or random type —O—(—$R_7$—O—)$_m$—(—$R_{7'}$—O—)$_m$—C(O)—$R_8$, wherein at least one of the following is true:
    (a'''') $R_7$ is a linear or branched hydrocarbon radical having from 2 to 4 carbon atoms;
    (b'''') $R_{7'}$ is a linear or branched hydrocarbon radical having from 2 to 4 carbon atoms; and
    (c'''') wherein n is from 1 to 40; and
    (d'''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and
(B) at least one anion selected from the group consisting essentially of $F^-$; $Cl^-$; $Br^-$; $I^-$; $NO_3^-$; $N(CN)_2^-$; $BF_4^-$; $ClO_4^-$; $PF_6^-$; $RSO_3^-$; $RCOO^-$; where R is an alkyl group, substituted alkyl group, or phenyl group; $(CF_3)_2PF_4^-$; $(CF_3)_3PF_3^-$; $(CF_3)_4PF_2^-$; $(CF_3)_5PF^-$; $(CF_3)_6P^-$; $(CF_2SO_3^-)_2$; $(CF_2CF_2SO_3^-)_2$; $(CF_3SO_2^-)_2N^-$; $CF_3CF_2(CF_3)_2CO^-$; $(CF_3SO_2^-)_2CH^-$; $(SF_5)_3C^-$; $(CF_3SO_2)_3C^-$; $[O(CF_3)_2C_2(CF_3)_2O]_2PO^-$; $CF_3(CF_2)_7SO_3^-$; and mixtures thereof.

6. The electrode material of claim 5, wherein the ionic liquid is one of:
  1-ethyl-3-methylimidazolium bis(trifluoromethylsulfonyl)imide ([EMIM][$Tf_2N$]);
  1-ethyl-3-methlimidazolium tetrifluoroborate ([EMIM][BE]); and
  mixtures thereof.

7. The electrode material of claim 1, wherein the activated carbon particles have a specific surface area of at least about 500 $m^2$/g.

8. The electrode material of claim 1, wherein the electrode material is positioned on a current collector, wherein the current collector and electrode material are in physical contact, wherein the electrode material has a mass ratio of the ionic liquid to the polymeric binder from about 0.01:1 to about 1:0.01, wherein the electrode material comprises: from about 0.5 wt % to about 95 wt % of the activated carbon particles; from about 0.5 wt % to about 95 wt % of the carbon nanotubes; from about 0.5 wt % to about 40 wt % of the polymeric binder; and optionally carbon particles, and wherein the electrode material further comprises from about 0 wt % to about 30.0 wt % carbon black.

9. The electrode material of claim 8, wherein the mass ratio of the ionic liquid to the polymeric binder is from about 0.1:1 to about 1:0.1, wherein the electrode material comprises: from about 60 to about 65 wt % of the activated carbon particles; from about 10 to about 25 wt % of the carbon nanotubes; from about 7 to about 20 wt % of the polymeric binder; and optionally from about 0 wt % to about 12 wt % carbon black and wherein the electrode material has one or both of a surface resistance from about 2 to about 12 ohms/cm and a specific surface area of from about 500 to about 2,000 m²/g.

10. An electrode material for an electrochemical energy storage device, comprising:
an ionic liquid having a plurality of activated carbon particles substantially intermixed and dispersed within an entangled carbon nanotubes network, wherein at least most of carbon nanotubes comprising the entangled carbon nanotube network are in contact with at least two or more activated carbon particles and wherein the ionic liquid substantially binds together the activated carbon particles and the carbon nanotubes.

11. The electrode material of claim 10, wherein the entangled carbon nanotubes network further comprise one of single walled carbon nanotubes, multi-walled carbon nanotubes, and mixtures thereof and wherein the carbon nanotubes have a length ranging from about 10 to about 1,000 μm and wherein the carbon nanotubes have an electrical conductivity of at most about 200 S/cm.

12. The electrode material of claim 10, further comprising a polymeric binder selected from the group consisting essentially of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof.

13. The electrode material of claim 10, wherein the ionic liquid comprises oppositely charged ions, wherein the ionic liquid has a melting point of no more than about 100 degrees Celsius, a decomposition temperature of at least about 200 degrees Celsius, a viscosity of no more than about 200 Cp, an ionic conductivity of at least about 0.1 mS/cm, and an electrochemical window of at least about 2 Volts and wherein the ionic liquid comprises:

(A) at least one cation selected from the group consisting essentially of the following compounds and mixtures thereof:

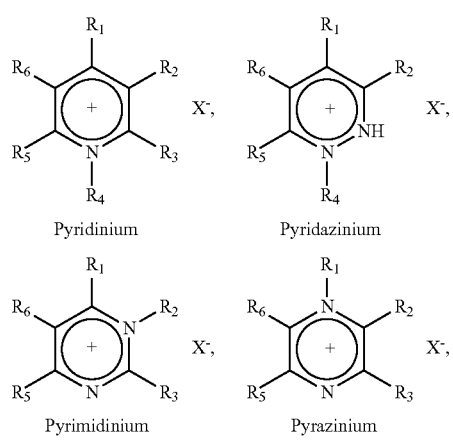

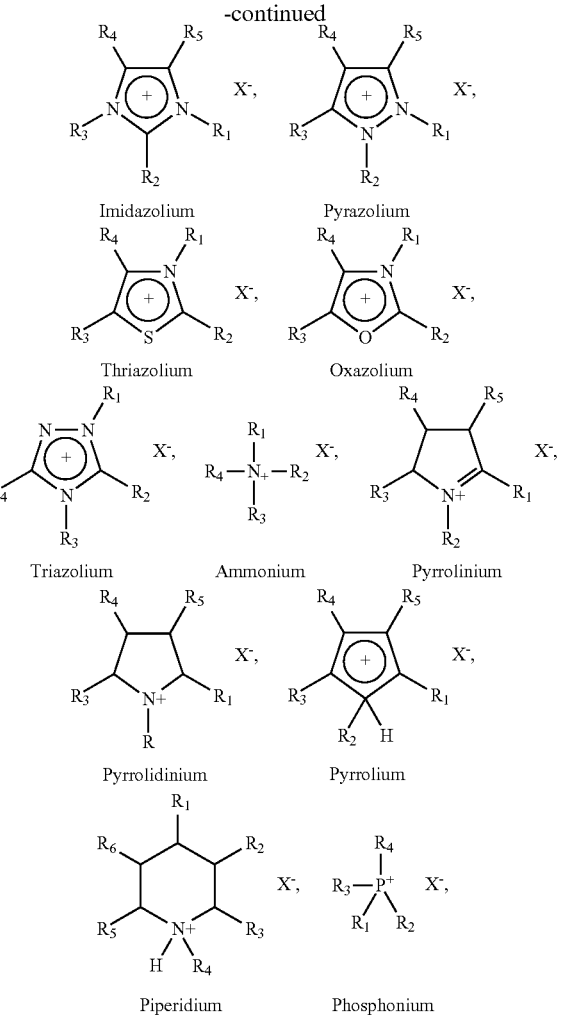

wherein $R_1$, $R_2$, $R_3$, $R_4$, $R_5$, and $R_6$ of the cationic components are identical or different and are selected from the group consisting essentially of:
(i) a hydrogen;
(ii) a halogen;
(iii) a hydroxyl;
(iv) an amine;
(v) a thiol;
(vi) a $C_1$ to $C_{25}$ straight-chain, or branched aliphatic hydrocarbon radical;
(vii) a $C_5$ to $C_{30}$ cycloaliphatic hydrocarbon radical;
(viii) a $C_6$ to $C_{30}$ aromatic hydrocarbon radical;
(ix) a $C_7$ to $C_{40}$ alkylaryl radical;
(x) a $C_2$ to $C_{25}$ linear or branched aliphatic hydrocarbon radical having interruption by one or more heteroatoms, such as, oxygen, nitrogen or sulfur;
(xi) a $C_2$ to $C_{25}$ linear or branched aliphatic hydrocarbon radical having interruption by one or more functionalities selected from the group consisting essentially of:
(a') a carbonyl;
(b') an ester;
(c') an amide, where R' is selected from the group consisting essentially of hydrogen, $C_1$-$C_{12}$ straight-chain, or branched or cyclic alkane or alkene;
(d') a sulfonate;
(e') a sulfonamide, where R' is selected from the group consisting essentially of hydrogen, $C_1$-$C_{12}$ straight-chain, or branched or cyclic alkane or alkene;

(xii) a $C_2$ to $C_{25}$ linear or branched aliphatic hydrocarbon radical terminally functionalized by Cl, Br, F, I, NH, OH, $NH_2$, $NHCH_3$ or SH;

(xiii) a $C_5$ to $C_{30}$ cycloaliphatic hydrocarbon radical having at least one heteroatom selected from the group consisting essentially of O, N, S, and optionally substituted with at least one of the following Cl, Br, F, I, NH, OH, $NH_2$, $NHCH_3$ or SH;

(xiv) a $C_7$ to $C_{40}$ alkylaryl radical heteroatom selected from the group consisting essentially of O, N, S, and optionally substituted with at least one of the following:
- (a") a $C_2$ to $C_{25}$ straight-chain, or branched hydrocarbon radical substituted with at least one of the following Cl, Br, F, I, NH, OH, $NH_2$, $NHCH_3$ or SH;
- (b") a $C_5$ to $C_{30}$ cycloaliphatic hydrocarbon radical substituted with at least one of the following Cl, Br, F, I, NH, OH, $NH_2$, $NHCH_3$ or SH
- (c") a hydroxyl;
- (d") an amine;
- (e") a thiol;

(xv) a polyether of the type —O—(—$R_7$—O—)$_n$—$R_8$ or block or random type —O—(—$R_7$—O—)$_n$—(—$R_{7'}$—O—)$_m$—$R_8$, wherein at least one of the following is true:
- (a''') $R_7$ is a linear or branched hydrocarbon radical having from 2 to 4 carbon atoms;
- (b''') $R_{7'}$ is a linear or branched hydrocarbon radical having from 2 to 4 carbon atoms; and
- (c''') wherein n is from 1 to 40; and
- (d''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and (xvi) a polyether of the type —O—(—$R_7$—O—)$_n$—C(O)—$R_8$ or block or random type —O—(—$R_7$—O—)$_n$—(—$R_{7'}$—O—)$_m$—C(O)—$R_8$, wherein at least one of the following is true:
- (a"") $R_7$ is a linear or branched hydrocarbon radical having from 2 to 4 carbon atoms;
- (b"") $R_{7'}$ is a linear or branched hydrocarbon radical having from 2 to 4 carbon atoms; and
- (c"") wherein n is from 1 to 40; and
- (d"") $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and (B) at least one anion selected from the group consisting essentially of F—; Cl—; Br—; I—; $NO_3$—; $N(CN)_2$—; $BF_4$—; $ClO_4$—; $PF_6$—; $RSO_3$—; RCOO—; where R is an alkyl group, substituted alkyl group, or phenyl group; $(CF_3)_2$ $PF_4$—; $(CF_3)_3$ $PF_3$—; $(CF_3)_4$ $PF_2$—; $(CF_3)_5$ PF—; $(CF_3)_6$P—; $(CF_2SO_3$—$)_2$; $(CF_2CF_2SO_3$—$)2$; $(CF_3SO_2$—$)_2N$—; $CF_3CF_2(CF_3)_2CO$—; $(CF_3SO_2$—$)_2CH$—; $(SF_5)_3C$—; $(CF_3SO_2)_3C$—; $[O(CF_3)_2C_2(CF_3)_2O]_2PO$—; $(CF_3(CF_2)_7$ $SO_3$—; and mixtures thereof.

14. The electrode material of claim 12, wherein the electrode material is in positioned on and is physical contact with a current collector and wherein the electrode material comprises: from about 0.5 wt % to about 95 wt % of the activated carbon particles; from about 0.5 wt % to about 95 wt % of the entangled carbon nanotube network; from about 0.5 wt % to about 40 wt % of the polymeric binder, from and optionally a plurality of carbon black particles, wherein the electrode material further comprises from about 0 to about 30 wt % carbon black, wherein the electrode material has a mass ratio of the ionic liquid to the polymeric binder form about 0.01:1 to about 1:0.01.

15. An electrode material for an electrochemical energy storage device, comprising:
a plurality of activated carbon particles substantially intermixed and dispersed within an with an entangled carbon nanotubes network, wherein the at least most of the carbon nanotubes comprising the entangled carbon nanotube network are in contact with at least two or more active carbon particles and wherein the electrode material has one or both of a surface resistance from about 2 to about 12 ohms/cm and a specific surface area of from about 500 to about 2,000 $m^2/g$.

16. The electrode material of claim 15, wherein the entangled carbon nanotube network further comprise one of single walled carbon nanotubes, multi-walled carbon nanotubes, and mixtures thereof and wherein the carbon nanotubes comprising the entangled carbon nanotube network have a length ranging from about 10 to about 1,000 μm and wherein the carbon nanotubes have an electrical conductivity of at most about 200 S/cm.

17. The electrode material of claim 15, wherein the activated carbon particles have a specific surface area of at least about 500 $m^2/g$ and wherein the electrode material is substantially free of any added carbon black.

18. The electrode material of claim 15, wherein the electrode material is positioned on a current collector, wherein the current collector and electrode material are in physical contact and wherein the electrode material comprises: from about 0.5 wt % to about 95 wt % activated carbon and from about 0.5 wt % to about 95 wt % of the entangled cabon nanotube network; and further comprising from about 0 wt % to about 30.0 wt % carbon black and from about 0.5 wt % to about 40 wt % polymer binder.

* * * * *